US008200239B2

(12) United States Patent
Mia et al.

(10) Patent No.: US 8,200,239 B2
(45) Date of Patent: *Jun. 12, 2012

(54) FEMTO-CELL LOCATION BY PROXY METHODS

(75) Inventors: Rashidus S. Mia, Phoenixville, PA (US); Robert J. Anderson, Phoenixville, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/269,000

(22) Filed: Nov. 11, 2008

(65) Prior Publication Data

US 2010/0120394 A1   May 13, 2010

(51) Int. Cl.
*H04W 24/00* (2009.01)
*H04W 36/00* (2009.01)
*H04W 40/00* (2009.01)
*H04M 11/04* (2006.01)

(52) U.S. Cl. ............... 455/456.1; 455/404.2; 455/444; 455/449

(58) Field of Classification Search ....... 455/456.1–458, 455/404.2, 444, 449
See application file for complete search history.

(56) References Cited

U.S. PATENT DOCUMENTS

| 4,445,118 | A | 4/1984 | Sennott |
| 6,047,192 | A | 4/2000 | Maloney |
| 6,064,336 | A | 5/2000 | Krasner |
| 6,119,000 | A | 9/2000 | Stephenson |
| 6,782,264 | B2 | 8/2004 | Anderson |
| 2003/0064734 | A1* | 4/2003 | Stilp et al. ............ 455/456 |
| 2006/0003775 | A1 | 1/2006 | Bull |
| 2006/0030333 | A1 | 2/2006 | Ward |
| 2007/0097939 | A1* | 5/2007 | Nylander et al. ........ 370/338 |
| 2007/0155401 | A1 | 7/2007 | Ward |
| 2007/0254620 | A1 | 11/2007 | Lindqvist et al. |
| 2008/0076419 | A1 | 3/2008 | Khetawat |
| 2008/0085699 | A1* | 4/2008 | Hirano et al. .......... 455/414.2 |
| 2008/0132247 | A1 | 6/2008 | Anderson |
| 2008/0188243 | A1* | 8/2008 | Giustina et al. ......... 455/456.6 |
| 2008/0261611 | A1 | 10/2008 | Mia |
| 2008/0261612 | A1 | 10/2008 | Mia |
| 2008/0299992 | A1* | 12/2008 | Eitan et al. ............ 455/456.5 |
| 2010/0184421 | A1* | 7/2010 | Lindqvist et al. ........ 455/418 |

FOREIGN PATENT DOCUMENTS

WO   WO 2008047140 A1 *  4/2008
WO   WO 2008/051929       5/2008

OTHER PUBLICATIONS

WO 2008/047140 A1 Controlling the Use of Access Points in a Telecommunications Network Law, Alan Vodafone Group PLC.*
WO 2008/047140 A1 Controlling the Use of Access Points in a Telecommunications Network Law, Alan Vodafone Group PLC Apr. 24, 2008.*

(Continued)

*Primary Examiner* — Nick Corsaro
*Assistant Examiner* — Michael Mapa
(74) *Attorney, Agent, or Firm* — Woodcock Washburn LLP

(57) ABSTRACT

Location of small, consumer deployed femto-cells cannot be determined by the usual site survey methods. Location of attached mobiles allows for a proxy location of the femto-cell that can then be used for wireless network planning including the provisioning of a calculated default emergency services location for the femto-cell.

24 Claims, 18 Drawing Sheets

OTHER PUBLICATIONS

"Study Find Interference Between Femtocells and Maco Network Not a Problem," Cellular-News, http://www.cellular-news.com/story/34931.php, downloaded 2008, 4 pages.

"At&t unwraps 3g microcell with gps," Macintosh News Networks, Inc., © 1995-2005, 1 page.

Ray, B., "Americans get indoor iPhones: Femtocells supersize while picocells go femto," The Register, © 1999-2009, p. 1-2.

PCT Notification of Transmittal of the International Search Report and the Written Opinion of the International Searching Authority mailed Feb. 25, 2010, issued in corresponding International Application No. PCT/US2009/060687.

U.S. Appl. No. 11/948,244, filed Nov. 30, 2007, Anderson.

U.S. Appl. No. 12/192,842, filed Aug. 15, 2008, LeFever.

Rubin et al., "Femtocells Bringing Reliable Location and Timing Indoors," InsideGNSS, www.insidegnss.com, Fall 2008, 40-46.

"Femtocells Designs "sniff" out Cells: Enables Self-Wireless Organizing Wireless Networks," Cellular-News, Nov. 7, 2008, 2 pages.

McKee, Charles W., "Sprint Airwave Femto-cell contains GPS and will not operate without a GPS fix," letter to the FCC dated Aug. 21, 2008, 2 pages.

Flanagan, Michael J., comment, "Could Femto-cells Bring More Problems Than They Solve?" Cellular-news, www.cellular-news.com, Aug. 7, 2008, 2 pages.

Dano, M., "Report: AT&T Mobility to sell $100 femtocells," RCR Wireless: Intelligence on All Things Wireless, Apr. 24, 2008, 2 pages.

Rao, Srinivasa et al., "Femtocell Network Architecture and Signaling Protocol Options," White Paper, Continuous Computing, www.ccpu.com, Mar. 2008, 1-9.

Ho et al., "Effects of User-Deployed, Co-Channel Femtocells on the Call Drop Probability in a Residential Scenario," The 18th Annual IEEE International Symposium on Personal, Indoor and Mobile Radio Communications (PIMRC'07), 2007, 5 pages.

"System Requirements for Femto Cells Systems," 3GPP2 S.P0126-0, 2008, 17 pages.

"Universal Geographical Area Description (GAD)," 3GPP TS 23.032 V7.0.0, published Jun. 2006, 30 pages.

TR-069, "CPE WAN Mangement Protocol 1.1." DSL Forum, May 2004, 109 pages.

PCT Notification of Transmittal of the International Search Report and the Written Opinion of the International Searching Authority mailed Dec. 10, 2009, issued in corresponding International Application No. PCT/US2009/060698.

* cited by examiner

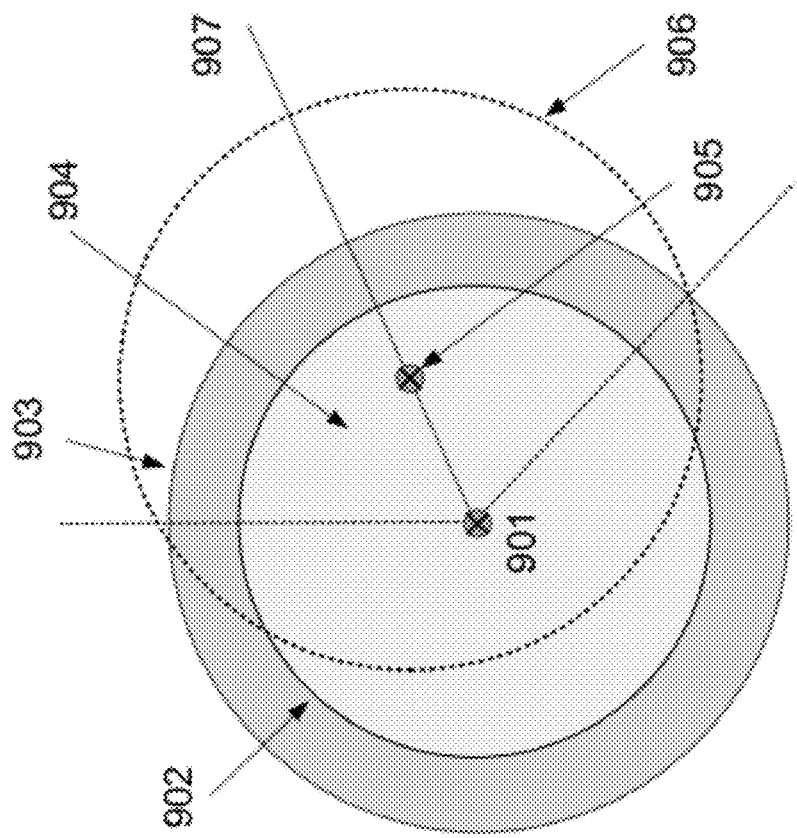
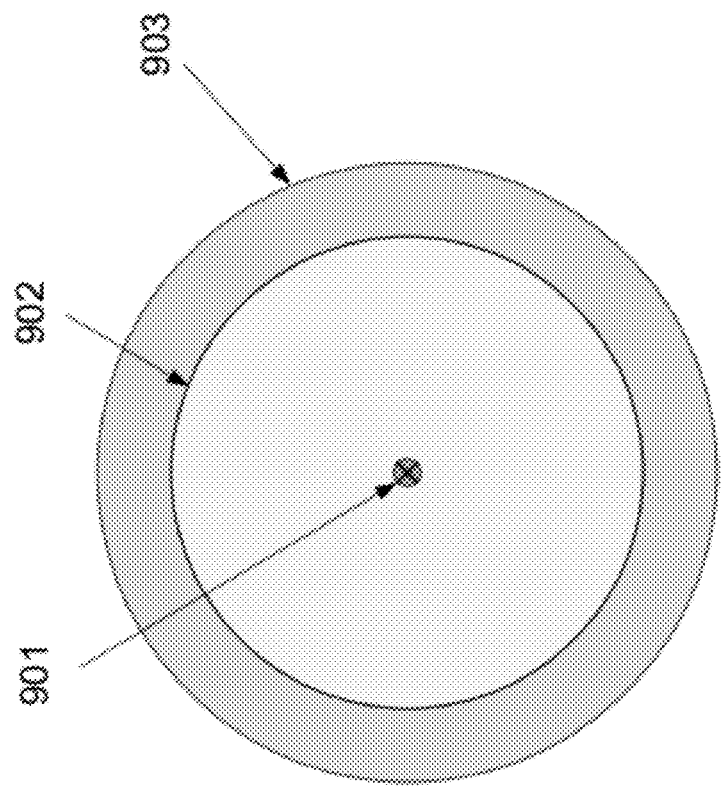
Figure 9b
Figure 9a

FEMTO-CELL LOCATION BY PROXY METHODS

CROSS REFERENCE

The subject matter described in this application is related to the subject matter of U.S. application Ser. No. 12/268,989, filed on Nov. 11, 2008, currently pending, entitled "Femto-Cell Location By Direct Methods," which is hereby incorporated by reference in its entirety

TECHNICAL FIELD

The subject matter described herein relates generally to methods and apparatus for locating wireless base stations via attached or proximate mobile devices, acquisition of on-air or on-line base station data, and using a discovered location and acquired radio and system data for RF planning (including provisioning of a calculated default emergency services location). In addition, the subject matter described herein relates to the use of wireless location technology to lower the cost and increase the interoperability of low-power base stations or access points.

BACKGROUND

Background information relating to the inventive technologies described herein will be summarized in this section. In addition, the following references provide further background information for the interested reader:
  3GPP2 S.P 0126-0 System Requirements for femto Cell Systems;
  "Universal Geographical Area Description (GAD)" Document ID: 3GPP TS 23.032 V7.0.0 (published June 2006);
  U.S. patent application Ser. No. 11/607,420, filed Dec. 1, 2006, entitled "System for Automatically Determining Cell Transmitter Parameters to Facilitate the Location of Wireless Devices" (published as U.S.20080132247A1);
  U.S. patent application Ser. No. 11/948,244, filed Nov. 30, 2007 "Automated Configuration of a Wireless Location System"; and
  TR-069, "CPE WAN Management Protocol 1.1" DSL Forum.

Since the advent of cellular telecommunications in 1984, and especially in the past decade, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS WCDMA, WiMAX, LTE and others.

The term CDMA will be used to refer to the CDMA digital cellular (TIA/EIA TR-45.4 defined IS-95, IS-95A), Personal Communications Services (J-STD-008), and 3GPP2 defined CDMA-2000 and UMB standards and air interfaces. The term UMTS will be used to refer to the 3GPP specified Wideband-CDMA (W-CDMA) based Universal Mobile Telecommunications System, defining standards, and radio air interface. The term WiMAX is used to denote the IEEE defined 802.16, "Broadband Wireless"; 802.20, "Mobile Broadband Wireless Access"; and 802.22, "Wireless Regional Area Networks" technologies. The present invention also applies to the in-progress 3GPP defined Long-Term-Evolution (LTE) and the 3GPP LTE Advanced system among others.

Wireless base stations, also sometimes called Access Points, are the radio connection point for analog or digital cellular frequency reuse systems such as personal communications systems (PCS), enhanced specialized mobile radios (ESMRs), wide-area-networks (WANs), and other types of wireless communications systems. The other end of the radio communications link will be referred to as the mobile or mobile device, which may be a mobile, portable or fixed device.

As the number of wireless communications protocols have grown, so has the number of types of base stations (sometimes called base transceiver stations, or BTS). Originally, cells (now called macro-cells) were deployed according to a detailed geographic, topographic and radio frequency propagation models to provide maximum coverage areas. Macro-cell base stations have typical power output ranges from the 10's to 100's of Watts. As the usage increased, channels were added to the existing base stations and new base stations were added. To limit interference between base stations, antenna down-tilt and transmit power levels were adjusted and radio frequency propagation modeling was used to increase the frequency reuse ratio from 12 to 7, 4, 3 and even 1 in some cases.

Smaller cells (micro-cells) with lower radio power outputs and smaller installation footprints were deployed to provide capacity where needed. In some markets, an overlay/underlay scheme of macro-cells and micro-cells were created to maximize capacity and geographic coverage. Micro-cells provide radio coverage over short ranges, typically from 300 to 1000 meters, and have lower output radio power compared to macro-cells, usually a few Watts. These macro/micro cell network solutions also had the virtue of limiting inter-BTS handoffs for fast moving mobile devices. As coverage requirements became more rigorous, even smaller and lower power base stations (Pico-cells) were deployed to cover dead zones and provide capacity in high-traffic areas. A Pico-cell radio power output is nominally less than 1 Watt.

The latest base station species is the femto-cell. A femto-cell differs from previous base station species in that a femto-cell is a portable, consumer deployed unit typically using licensed spectrum. Unlike the traditional base station, backhaul to the wireless communications network is via a consumer provided packet data (IP) connection rather than the dedicated or leased line switched circuit backhaul used in first and second generation cellular systems. Designed for indoor coverage, femto-cell radio power output nominally ranges from 0.5 to 0.1 Watt. Femto-cells are also known as "Home eNode B's" in the Third Generation Partnership Program's (3GPP) Long Term Evolution (LTE) or Evolved UTRAN (eUTRAN) program.

Using consumer installed femto-cells as a low cost approach to adding coverage and capacity to the wireless communications network raises some difficulties that embodiments of the present invention seek to address. The femto-cell base station can be a temporary, portable, and consumer controlled device but it uses spectrum licensed to the wireless communications provider (WCP); therefore, radio frequency use and power should be managed to both allow the femto-cell to function and to minimize interference with the wireless communications network, including other femto-cells. Proposed femto-cell management protocols, such as the DSL Forum's TR-069, *"CPE WAN Management Protocol 1.1"*, serve to auto-discover, provision and manage femto-cells but do not supply the femto-cell location. Also, since mobile devices using the femto-cell base station capacity should be able to use emergency services, the location of the femto-cell, if not the mobile device itself, should be provided in accordance to the United States Federal Communications Commission (FCC) mandate. To limit interference, early femto-cells will be able to listen to the surrounding radio environment and configure themselves automatically to minimize interference with the macro wireless communications network and other nearby femto-cells. Although some operator deployments may also use a distinct spectral band for femto-cells and thus limit interference with the wide-area radio communications network, femto-cell location may still be required by the FCC E911 Phase 2 mandate.

In one already described scenario, using the downlink receiver subsystem (as described in U.S. patent application Ser. No. 11/736,868, "Sparsed U-TDOA Wireless Location Networks," and expanded in U.S. patent application Ser. No. 11/948,244, "Automated Configuration of a Wireless Location System") of a network-based UTDOA wireless location system, location of stationary and mobile cells (including macro, micro, Pico, and femto-cells) can be acquired via detection and processing of the broadcast beacon(s). The broadcast beacon commonly implemented as a channel, or set of channels, in wireless radio access networks (GSM: BCCH, UMTS: BCH [PCCPCH], and CDMA: Broadcast Control Channel and pilot channel) allows mobile phones to discover geographically local base stations.

Overlay Network-based location solutions use specialized receivers and/or passive monitors within, or overlaid on, the wireless communications network to collect uplink (mobile device-to-base station) signals, which are used to determine location and velocity of the mobile device. Overlay Network-based techniques include uplink Time-Difference-of-Arrival (TDOA), Angle-Of-Arrival (AOA), Multipath Analysis (RF fingerprinting), and signal strength measurement (SSM).

Mobile-device based location solutions use specialized electronics and/or software within the mobile device to collect signaling. Location determination can take place in the device or information can be transmitted to a landside server which determines the location. Device-based location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. An example of a GNSS system is the United States NavStar Global Positioning System. Hybrids of the network-based and mobile device-based techniques can be used to generate improved quality of services including improved speed, accuracy, yield, and uniformity of location. A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM). Hybrids of the network-based techniques can be used to generate improved quality of services including speed, accuracy, yield, and uniformity of location.

SUMMARY

Location of small, consumer deployed femto-cells cannot be determined by the usual site survey methods. Location of the femto-cell is of the upmost importance since the femto-cell location may be the only caller location available given the indoor deployment of these low-powered base stations. One method of locating the femto-cell is by the location of associated mobiles, allowing for a proxy location of the femto-cell, in effect using wireless devices as distributed network probes. Associated mobiles include those in-service (attached) to the femto-cell, those being handed-off to or from the femto-cell to the wider area wireless communications system, those mobiles in proximity to the femto-cell that report the femto-cell as a handover candidate or those mobile in proximity to the femto-cell that include the femto-cell in soft-handoff or as a candidate for soft-handoff. Since the femto-cell broadcasts are persistent and the femto-cell deployment is static, multiple proxy locations can be probabilistically combined to determined a proxy location for the femto-cell.

Once a femto-cell location has been developed, that location can then be used for wireless network planning including the provisioning of a calculated default emergency services location for the femto-cell users and handover planning for the wide area cellular network and femto-cell to femto-cell handoff.

Other inventive aspects are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 9a, 9b, 9c, 9d, and 9e are illustrative examples that graphically portray various GSM network and mobile-based location techniques for locating a mobile device that can be used as a proxy for femto-cell location.

DETAILED DESCRIPTION OF ILLUSTRATIVE EMBODIMENTS

We will now describe illustrative embodiments of the present invention. First, we provide a detailed overview of the problem and then a more detailed description of our solutions.

Overview

The location methodology employed by a wireless location system may be dependent on the service area deployed or capabilities of the type or model of the femto-cell deployed. Network-based wireless location systems can collect radio energy and signaling from either or both the reverse control and traffic channels (mobile to base station), the forward (broadcast) channel (broadcast by the femto-cell) and/or the forward traffic channel (cell-to-mobile device). Location can be accomplished for any of those channels using POA (Power of arrival for ranging), PDOA (power difference of arrival), TOA (time of arrival), TDOA (time difference of arrival), or AOA (angle of arrival), or combinations of these techniques. femto-cell based wireless location systems may include those using POA, PDOA, TOA, TDOA, GPS, or A-GPS. Hybrids, combining multiple network-based techniques, multiple device-based techniques, or a combination of network and device based techniques, can be used to achieve the accuracy, yield, and latency requirements for the location-based application. The location of femto-cells via proxy techniques are, in effect, locations of opportunity by the wireless location system. The techniques described may be available only during short time periods, using certain location-equipped mobiles, or during certain network events (handover, call origination/termination, registration, for example). The location of the mobile phone served by the femto-cell serves as an estimate of the location of the mobile device. As described in U.S. patent application Ser. No. 11/607,420 "System for Automatically Determining Cell Transmitter Parameters to Facilitate the Location of Wireless Devices", it is possible to use wireless devices as distributed network probes. As a matter of course, the standardized wireless devices collect broadcast cell information from nearby base stations to facilitate mobility operation such as handover (between frequencies, sectors, or cells of the same network), handoff (transferring communications between networks), and soft handoff (adding and deleting radio links in a spread spectrum system such as CDMA or UMTS). Location of a cell site, including a femto-cell, via wireless device provided data is referred to herein as cell-site location-by-proxy. The wireless location system may be triggered to locate femto-cells either by operator command, via wireless intelligent network triggers based on the femto-cell broadcast cell-ID, or automatically by the RNM (radio network monitor) or LMS (link monitoring system) equipped WLS whenever a new cell-ID is detected on the network.

Figure 1:
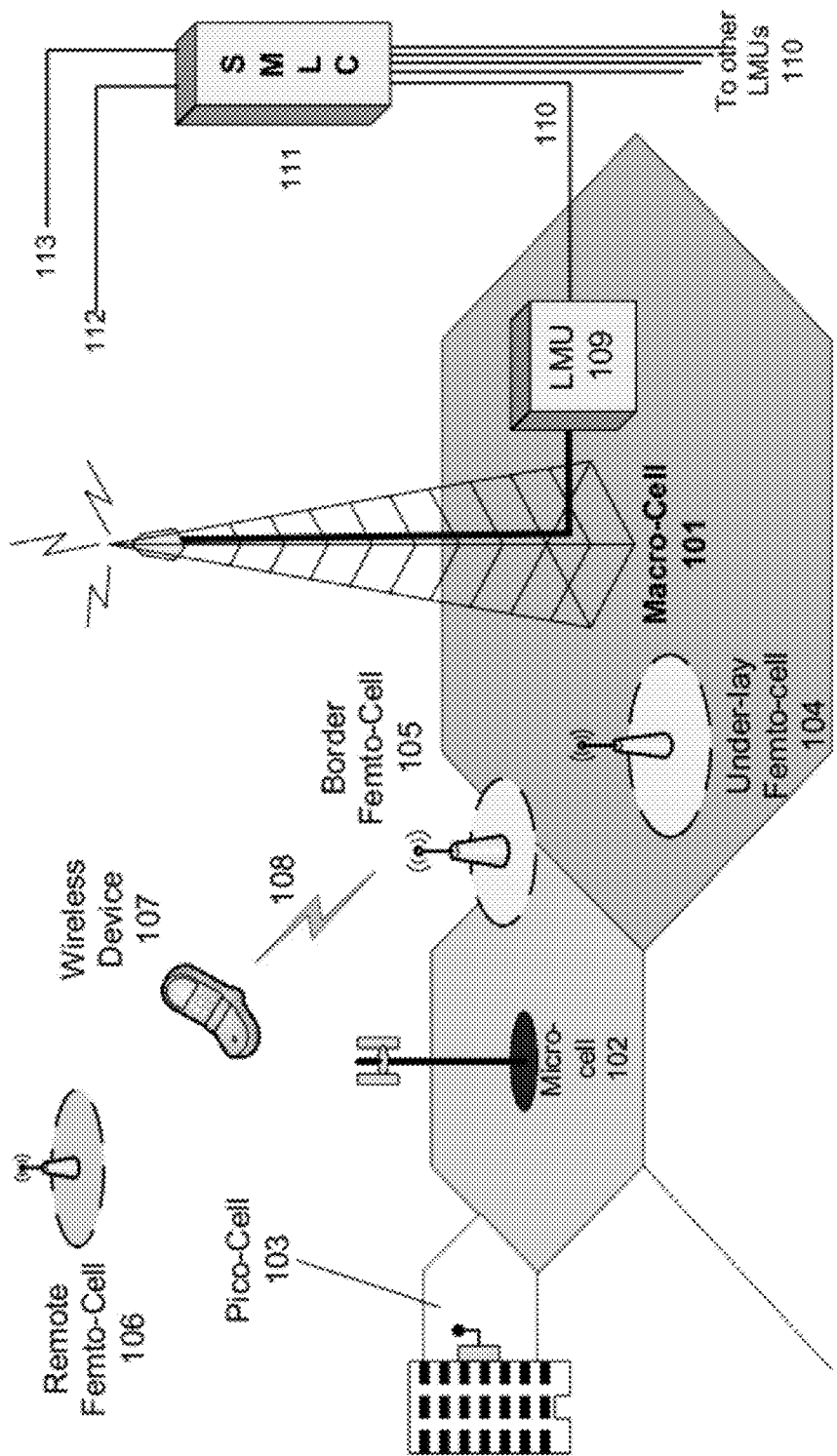
FIG. 1 schematically depicts femto-cells as implemented in a wide-area wireless communications network.

Femto-cells in a wide area wireless communications system are shown in FIG. 1. The wide-area or macro-cellular network comprises geographically distributed cells (which may be a mix of macro-cells 101, micro-cells 102, and Pico-cells 103, repeaters (not shown) and distributed antenna systems (not shown)). An under-lay femto-cell 104 may exist in the radio footprint of another cell providing additional traffic capacity. A Border femto-Cell 105 may under-lay multiple cell radio footprints and a remote femto-cell 106 may exist outside of the coverage (in dead areas) of the wide-area wireless network, providing increased coverage. When using femto-cells within a wide-area wireless communications network, the same mobile device 107 can communicate via radio signaling 108 with any of the macro-cell 101, micro-cell 102, Pico-cell 103, and femto-cell 104 105 106 radio base stations. The wireless communications system may be deployed with a wireless location system. For mobile-based location techniques, the mobile device 107 and Serving Mobile Location Center (SMLC) 111 are used to determine a location. For overlay network-based location techniques, LMUs (Location Measuring Units) 109 may be deployed either as standalone devices or with base stations. The LMU 109 communicates with the SMLC 111 via packet data connections 110. The SMLC 111 communicates with one or more wireless communications networks via packet data connections 112. The SMLC may also receive information to generate location estimates via packet data connections 113 from link monitors deployed within the wireless communications system's internal network. The SMLC contains a database 114 detailing the cell locations and other radio aspects of the wireless communications network.

Femto-cell Proxy location via Attached Mobile

Figure 2:
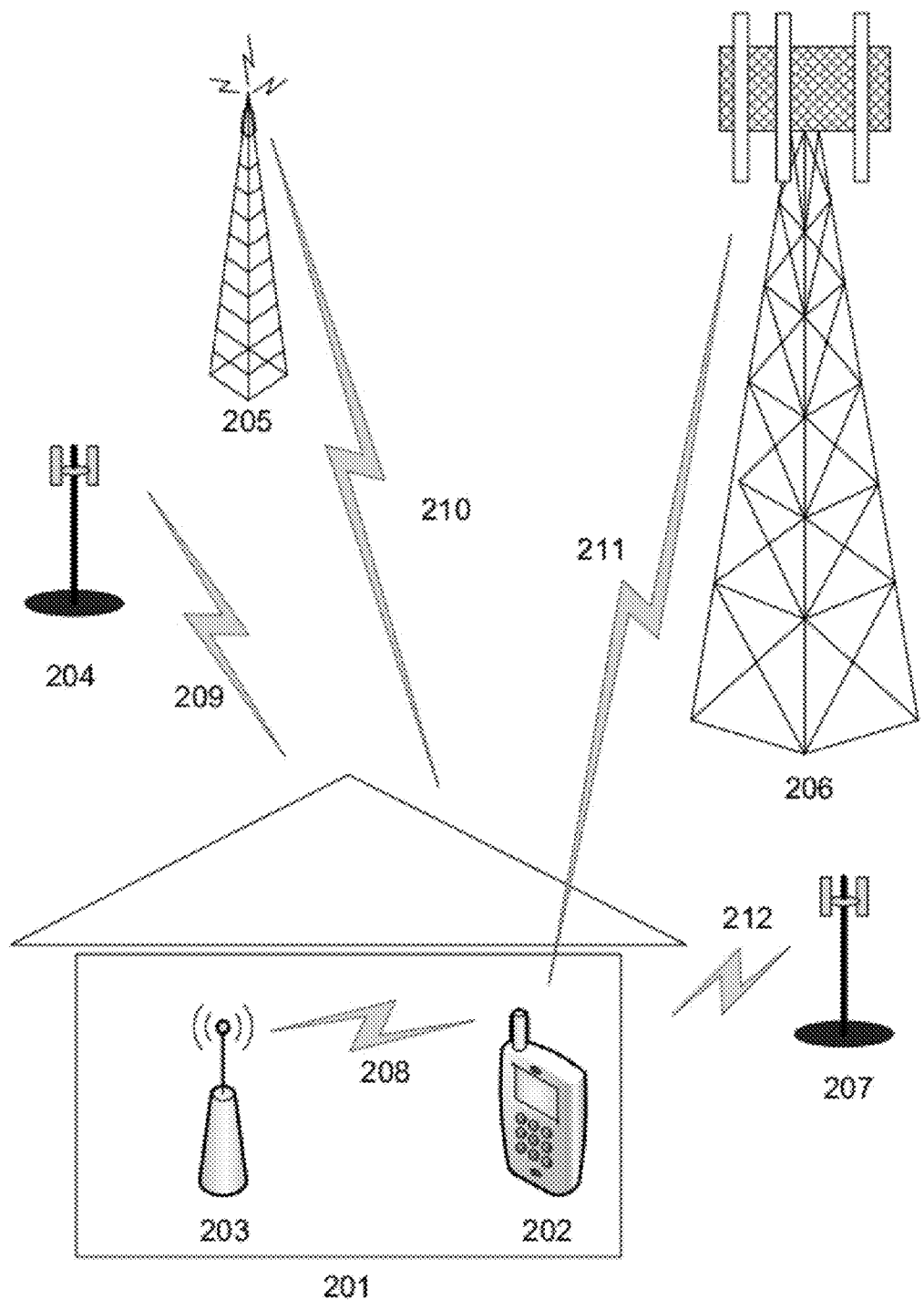
FIG. 2 illustrates an example proxy location of a femto-cell using monitoring of mobile provided broadcast information, signal power and signal timing information.

FIG. 2 depicts the location of the femto-cell via a proxy mobile, which provides the SMLC with information obtained from signal measurements and cell broadcast information. In the described technique, the wireless devices act as distributed network probes. As a matter of course, the wireless devices collect broadcast cell information from nearby base stations to facilitate mobility operations such as handover (between frequencies, sectors, or cells of the same network), handoff (transferring communications between networks), and soft handoff (adding and deleting radio links in a spread spectrum system such as CDMA or UMTS). The SMLC 111 (FIG. 1) uses these collected data (either delivered by the wireless communication network via a standardized communications link or from link monitoring probes installed within the carrier network via a private communications link) with the network topology information stored in the SMLC database 114 (FIG. 1) to determine a rough location of the femto-cell 203.

In the illustration of FIG. 2, the MS 202 collects information including that broadcast by the femto-cell 203 and the beacons 209, 210, 211 and 212 from the surrounding cells 204, 205, 206 and 207, respectively. The femto-cell 203 can collect beacon information (as described in co-pending U.S. application Ser. No. 12/268,989, filed on even date herewith, entitled "System and Method for Direct Femto-Cell Location. The mobile collected information is sent to the radio access network per mobile assisted handoff standards and is passively intercepted and fed to the SMLC via a link monitoring system.

Femto-Cell Proxy Location via Location-Capable Attached Mobile

An alternative method of locating a femto-cell via proxy is the location of a mobile using the femto-cell for communications. The location technology used is dependent on the wireless radio technology and the implementation of on-board location capability in the mobile device. For those makes and models of femto-cells equipped with a Location Determination Subsystem (LDS), position calculation may be accomplished using downlink techniques. The LDS of the femto-cell enables device-based, network-based and/or hybrid location technologies. This subsystem can collect power and timing measurements, cell-broadcast information and other collateral information for various location methodologies, including but not limited to: device-based time-of-arrival (TOA), forward link trilateration (FLT), Advanced-forward-link-trilateration (AFLT), Enhanced-forward-link-trilateration (E-FLT), Enhanced Observed Difference of Arrival (EOTD), Observed Time Difference of Arrival (O-TDOA), Global Positioning System (GPS) and Assisted GPS (A-GPS). The location methodology may be dependent on the characteristics of the underlying radio communications network or radio location system used by the wireless communications network provider. The inclusion of a known femto-cell ID or an unknown cell-ID in the collected data is the trigger for this location event. For mobile devices without on-board location capabilities, localization techniques such as cell-ID, cell-ID with radio-time-of-flight ranging, and Signal Strength Measurement (SSM) can be used. Hybrid location techniques such as Enhanced Cell-ID (ECID) are possible when the serving cell-ID, radio-time-of-flight, and broadcast signal power levels from three or more cell site antennae are available.

Figure 3:
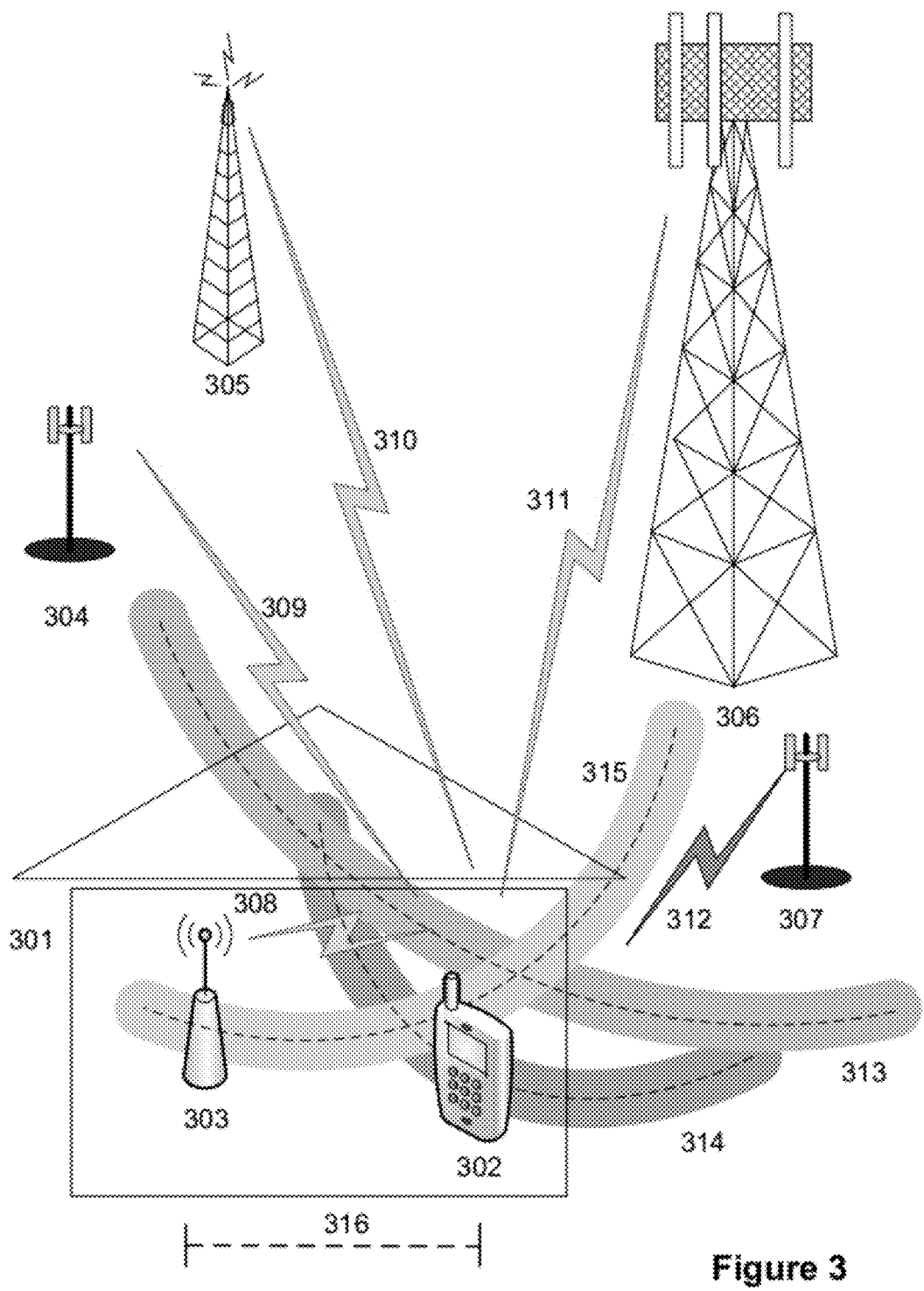
FIG. 3 shows an illustrative example proxy location of a femto-cell by location of an attached mobile using mobile-based wireless location techniques.

FIG. 3 illustrates an example of a femto-cell location via proxy. In this example, the mobile device 302 is in duplex communication 308 with the femto-cell 303. Despite the radio attenuating surrounding structure 301, the mobile device 302 is able to detect and demodulate three-or-more beacons (309, 310, 311) from the nearby macro-cells (306, 305) and micro-cell 304. Additional beacon(s) 312 from other nearby base station(s) 307 may be blocked, under a detection threshold, or at least temporarily unavailable. Since three beacons (309, 310, 311) are available, a time-difference or power-difference of arrival location can be calculated for the mobile device 302 using the received signals. In CDMA systems, the time-based AFLT technique can be used. In GSM systems, the PDOA technique is possible given the SMLC database of beacon antennae locations and beacon transmit power levels. The ECID technique can be performed, but is limited due to the lack of time-based ranging from the serving femto-cell since the femto-cell location is unknown.

Enhanced Observed Time Difference (EOTD) is a location technique defined in the ETSI 3GPP Technical Specification 43.059 in which a GSM MS makes relative time difference measurements of the beacon signals transmitted by geographically distributed base stations, where these measurements are used to compute a position. If an EOTD capable mobile is detected either using a femto-cell or having a femto-cell as a possible handover candidate, then EOTD can be used to localize the femto-cell. Advanced Forward Link Trilateration (AFLT) is a technique defined in the TIA IS-95 and CDMA 2000 standards in which a CDMA MS makes relative time difference measurements of the pilot signals transmitted by geographically distributed CDMA base stations, where these measurements are used to compute a location.

Observed Time Difference (OTD) is a location technique defined in the ETSI 3GPP Technical Specification 23.271 in which the User Equipment (UE), which is essentially a mobile station in a UMTS network, makes relative time difference measurements of the signals transmitted by geographically distributed Node Bs (base stations in a UMTS system), where these measurements are used to compute a location.

Enhanced Cell Identification (ECID) is a technique used to locate GSM MSs in which the MSs perform received power level measurements of the signals transmitted by geographically distributed GSM base stations, where these power measurements, along with the location of the serving cell, known broadcast power of the serving cell and the radio time-of-flight determined range from the serving cell, are used to compute locations.

Once a proxy location is found, an effort to ascertain the range 316 from the proxy mobile 302 to the femto-cell 303 may be made using time or power-level measurements between the femto-cell and the mobile device 302.

Femto-Cell Proxy Location via GNSS-Capable Attached Mobile

Figure 4:
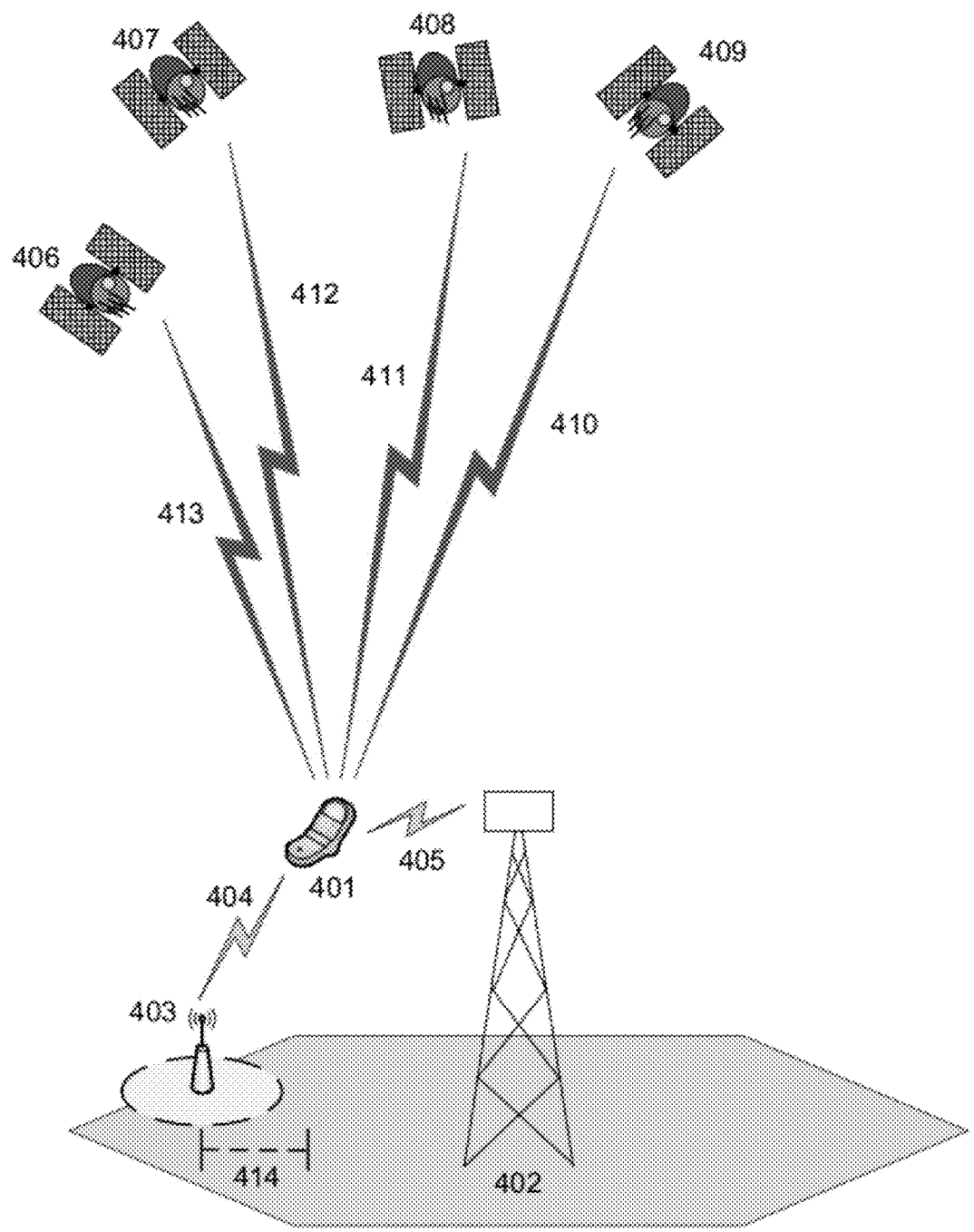
FIG. 4 shows an illustrative example proxy location of a femto-cell by location of an attached mobile using satellite-based techniques.

FIG. 4 graphically depicts the location of the femto-cell via a proxy mobile in the case where the mobile device 401 has on-board GNSS receiver capability. This GNSS capability may be augmented by assistance data and timing as described in U.S. Pat. No. 4,445,118, "Navigation system and method" Taylor et al and U.S. Pat. No. 6,064,336, "GPS receiver utilizing a communication link", Krasner et al. If the GNSS equipped mobile is in an area where a TDOA/AoA network-based wireless location system is deployed, hybrid GNSS location techniques may be employed as described in Published U.S. Patent Application US20050148346A1, filed on Dec. 30, 2003, entitled "TDOA/GPS Hybrid Wireless Location System." As shown in FIG. 4, if the Mobile Device is in communication with a femto-cell and four or more GNSS satellites (406, 407, 408, 409) with radio signals (410, 411, 412, 413) capable of being received by the GNSS equipped mobile device, then the location of the mobile device can be developed and thus a proxy location for the serving femto-cell. Based on the serving femto-cell transmission signal strength and/or signal quality, a time-of-flight or power-based range determination 414 maybe used to further localize the femto-cell or create and error estimate for the proxy location. This proxy location of a femto-cell via an attached GNSS equipped mobile device also applies in the case where a soft handoff exists and the mobile 401 maintains radio links (404, 405) with the femto-cell 403 and other base station(s) 402.

A low-accuracy, low confidence proxy location of a femto-cell via a GNSS equipped mobile device can also be established when the mobile device is served by another cell 402, but reports the femto-cell 403 (via reception of the femto-cell broadcast 404 above the set power threshold) as a possible handover candidate.

Femto-Cell Location using Mobile Uplink Transmissions During Handover

A proxy location for the femto-cell can be made by locating a mobile as it undergoes handover into or out-of the femto-cell using a Network-based wireless location system or Mobile-based location technique. When using the Network-based TDOA/AoA location system, this technique has the benefit of the higher power uplink transmissions used to communicate with the wide-area wireless communications network.

Using the radio network monitor (RNM) or link monitoring system (LMS) or equivalent as described in U.S. Pat. No. 6,782,264, "Monitoring of call information in a wireless location system," and U.S. patent application Ser. No. 11/150414, "Advanced triggers for location-based service applications in a wireless location system," the handover between the femto-cell and the wide area wireless network can be detected and the mobile located immediately before or after a handover/handoff providing the opportunity for an estimate of the femto-cell location. Both handovers from and into the wide area wireless network can be detected and used to locate the mobile device. The location of the mobile device served by the femto-cell serves an estimate of the location of the femtocell. This operation can use the mobile device collected information or a network-based wireless location system to provide location information.

Figure 5:
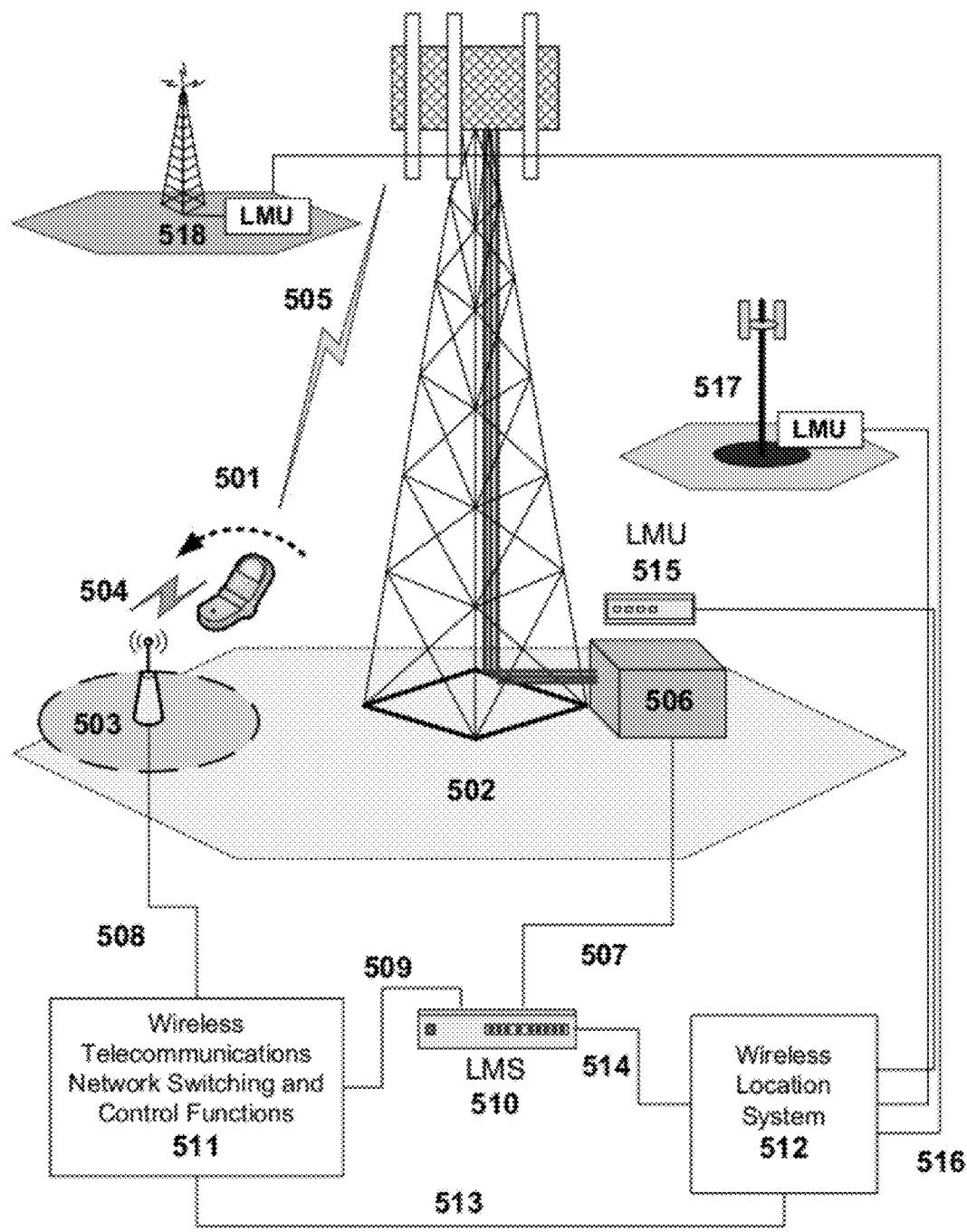
FIG. 5 shows an illustrative example proxy location of a femto-cell by location of a mobile on handover between the macro wireless network and the femto-cell.

As shown in FIG. 5, a mobile device 501, moving from the radio coverage area 502 of the macro-cell BTS 506 to a femto-cell 503, communicates with both cells via radio links 504 505 briefly during an inter-cell handover. The wireless location system is triggered by the Link-Monitoring System (LMS 510). The LMS is an improvement to the Abis Monitor (also called the Abis Monitoring System, or AMS) described in U.S. Pat. No. 6,782,264, and is able to monitor not only the Abis and A interfaces, but also the GSM-MAP, Iub, Iu-PS and Iu-CS interfaces and in some cases the Iur interface. The LMS can be implemented, with modifications, on the same hardware/software chassis as the Abis Monitor. The LMS passively monitors message traffic within the wireless communications system to trigger the wireless location system based on pre-set criteria.

The LMS 510 and RNM triggering of the wireless location system is further detailed in U.S. patent application Ser. No. 11/150,414, "Advanced triggers for location-based service applications in a wireless location system," and Ser. No. 11/198,996, "Geo-fencing in a wireless location system". Detection of events such as handover is described in U.S. Pat. No. 6,119,000, "Method and apparatus for tracking identity-code changes in a communications system". Capabilities of the LMS 510 may also be built into wireless telecommunications network equipment 506 511. As shown, the LMS 510 monitors the BTS-Span 507 (in GSM, the "Abis", in IS-95, the "IS-634", in UMTS, the "Iub"), and the LMS 510 may also connect (via digital data link 509) to passive probes (not shown) and monitor other data links within the Wireless Telecommunications Switching and Control Functions Network 511 as needed or dictated by the manufacturer and operator network design and configuration elections. Once the handover initiation has been detected by the LMS 510 and meets triggering criteria (in this case the femto-cell 503 Cell-ID present in the handover messaging), the LMS 510 informs the SMLC of the WLS 512 via the digital packet LMS-to-SMLC link 514.

For Cell-ID with Ranging, ECID, AFLT, E-OTD, and OTDOA techniques, the mobile memory or the LMS memory may store a sliding window of signaling, timing and power level information. The handoff trigger to a known femto-cell cell-ID or to an unknown cell-ID would prompt the recovery of the information collected immediately before the handover event. The cached information would be passed via data connection 514 to the SMLC 512 and used to generate the location estimate.

For U-TDOA and/or AoA uplink-based wireless location systems, the LMS 510 would trigger the SMLC 512 immediately, providing serving cell and current uplink radio channel information for LMU network 515 tasking via the LMU data links 516. The LMU Network 515 comprises geographically distributed LMU receivers normally sited at nearby 517 and proximate 518 BTSs. This immediate triggering allows the LMU network 515 to collect the higher power signaling to the macro-cellular network to be used for wireless location generation.

Please note that although the illustrative example in FIG. 5 shows an intercellular handover from the high-power macro-cell to the lower-power femto-cell, the reverse handover is also detectable and locatable using the same methodology but different messaging. If the LMS 510 monitoring and triggering functionality is built into the Wireless telecommunications Switching and Control Network 511, the SMLC may be informed of the handover event via the standardized connection 513 (examples include the "Lb" interface in GSM, the "Iupc" interface in UTMS, the "E5" or "E12" interface in J-STD-036). Handover between femto-cells can also be captured by the above method, allowing determination of boundaries between femto-cells.

Figure 6:
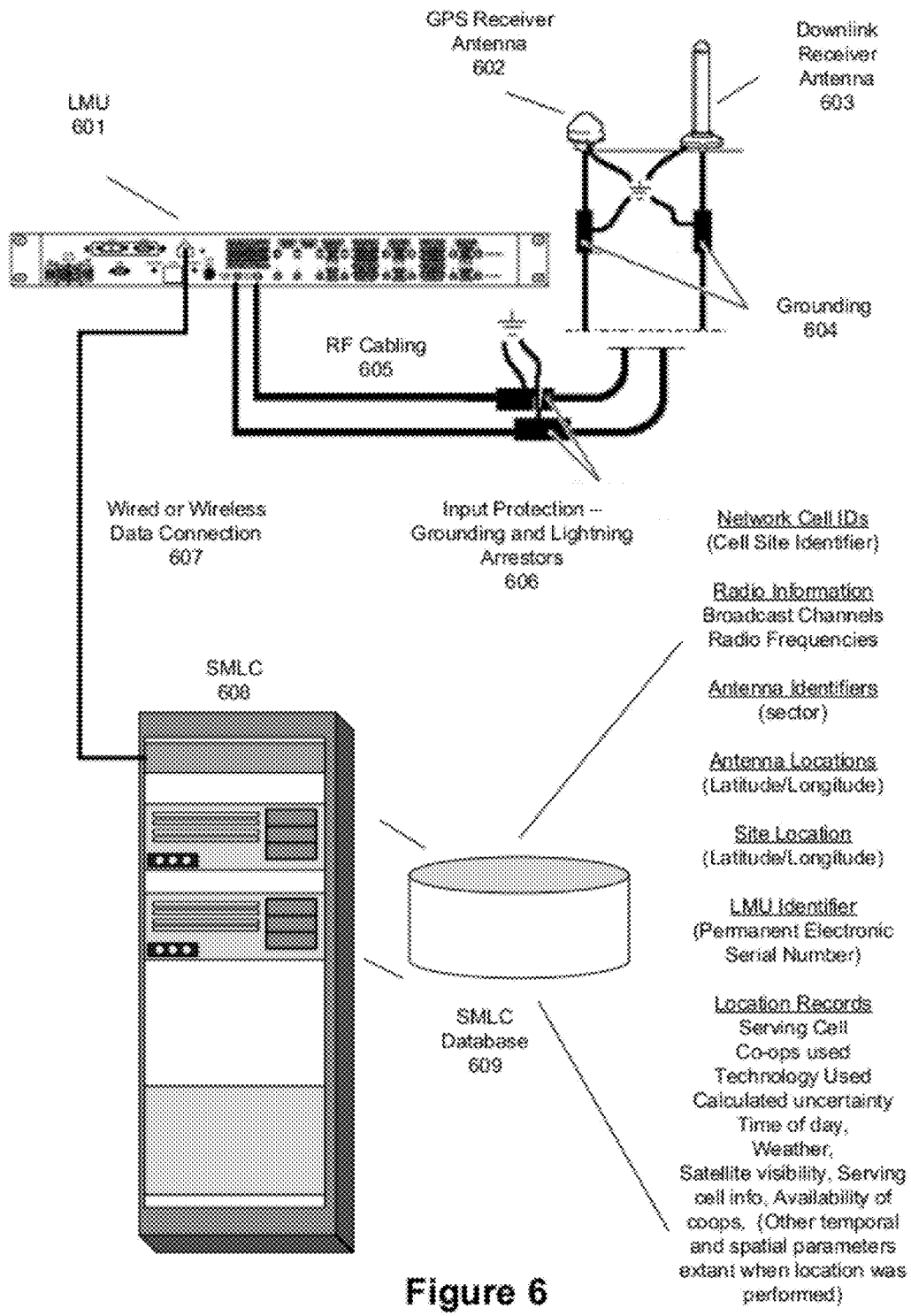
FIG. 6 depicts an illustrative example of a wireless location system as implemented in a representative wireless communications system, in this example a dual-mode GSM-UMTS network.

FIG. 6 schematically depicts an exemplary deployment of an overlay WLS comprising an LMU 601; GPS receiver antenna 602; downlink receiver antenna 603; grounding 604 and input protection 606 needed to safely interface the LMU 601 to the exterior mounted antennae 602, 603; SMLC 608 and SMLC database 609; and radio frequency cabling 605. As shown, the LMU 601 is connected to the SMLC 608 via a wired or wireless connection 608, which carries TCP/IP packet-based communications. The SMLC 608 hosts the SMLC Database 609, which contains the network cell identifiers, network antenna identifiers, network antenna locations, LMU (cell) locations, and LMU identifiers. The SMLC 608 also stores, or is coupled to, a database of location records (e.g., the SMLC database 609). This database can be used to predict the quality-of-service for a location application based on the mobile device or network supplied cell-ID and proximity information (such as CGI+TA in GSM or CI+RTT in UMTS for example) prior to signal collection and/or location calculation. This same database can be used as described herein to hold the radio and network parameters generated by manual entry, downloading from the OSS, or developed from the GPS and/or downlink receiver subsystems. For the Location of femto-cells in a wireless communications network, the SMLC 608 would collect network cell identifiers and network antenna identifiers and develop network antenna locations (femto-cell locations) for inclusion into the SMLC database 609.

Figure 7:
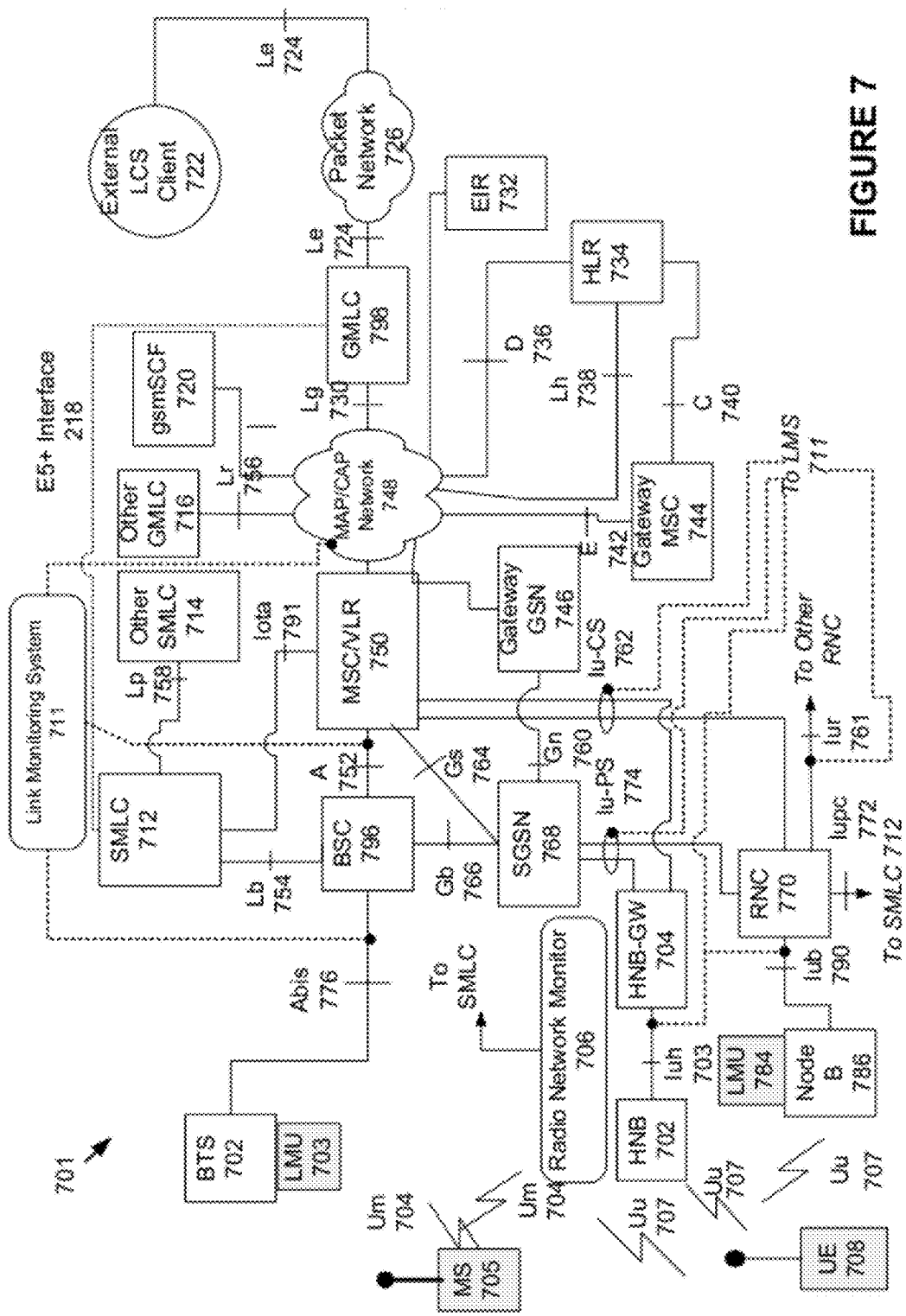
FIG. 7 shows a representative mobile communications network wherein an embodiment of the present invention may operate.

FIG. 7 shows the architecture of an illustrative network reference model (NRM) 710, using the GERAN/UTRAN standard NRM. The standardize NMR has been enhanced with pre-standard, optional, and non-standard components that include a radio network monitor (RNM) 782, a link monitoring system (LMS) 711, the Iota 791 interface and the femto-cell (Home Node B (HNB)), the femto-cell gateway (the Home Node B gateway (HNB-GW) and the Iuh interface between the HNB and HNB-DW. The Home NodeB (HNB) is a consumer installed, plug-and-play base station intended to connect to an existing wired or wireless broadband service for backhaul. The HNB is designed to provide wireless radio coverage for standard mobile devices within a home or office. HNBs incorporate the capabilities of a standard NodeB as well as limited radio resource management functions similar to those of a Radio Network Controller (RNC). Handover between the wide-area radio network and the HNB is supported. The HNB Gateway is the concentrator for the distributed HNB base stations. Deployed by the wireless communications network provider in the core wireless services network, the HNB-GW communicates with multiple HNB via the Iuh interface. The HNB-GW then passes traffic onto the switched circuit network (via the MSC) via the Iu-CS interface and packet data streams to the packet network (via the SGSN) via the Iu-PS interface.

The Iota 791 interface is an enhancement from the existing standardized interfaces shown in FIG. 7. Using the Iota 791, the Wireless Communications Network can signal the Wireless Location Network (in this case the SMLC 712) when triggers (e.g. dialed digits, subscriber ID, or mobile ID) are met. Using Iota 791 interface the Wireless Location Network can signal the Wireless Communications Network for radio information and when a inter-RAT handoff is required. The Iota 791 is a set of capabilities and not necessarily a direct wired interface, for this illustrative dual-mode network the Iota 791 interface is shown as joining the SMLC to MSC, but in actual implementation, this interface could easily connect the MSC to the MPC, the GMLC, the gsmSCF or any Intelligent Peripheral on the Wireless intelligent network. An preferred implementation of the Iota interface is as a non-standard (or enhancement of a standardized) digital packet interface using a extension of the existing Wireless intelligent network protocols (IS-41, WIN, CAMEL) to interconnect the MSC 750 and the SMLC 712. Use of the Iota 791 interface allows the MSC 750 quickly query the SMLC 712 for location and allows the SMLC 712 to request idle mobile locations (page of idle mobile), channel and cell information for a mobile, and request an inter-Radio Access Technology (RAT) handover. Use of a modified Wireless intelligent network protocol allows the SMLC 712 to communicate with multiple MSC 750 in the case where an inter-system inter-Radio Access Technology (RAT) handoff is needed. Some capabilities of the Iota 791 interface already exist in the ETSI/ANSI IS-41 E2 interface as defined in Joint Standard 36 (J-STD-036) "Enhanced Wireless 9-1-1 Phase 2").

The radio network monitor (RNM) 782 is wideband multi-channel radio receiver, effectively a bank of ad hoc tunable narrowband receivers, tunable to both the uplink and downlink channels anywhere in the frequency band. The RNM 782 was initially implemented on an LMU radio receiver platform (the present LMU was previously described in U.S. Pat. No. 6,782,264 as the alternative narrowband embodiment of the receiver module for the SCS). The RNM uses its radio receivers to collect signaling to trigger the wireless location system. The RNM and its operations, capabilities and functionality is described in more detail in U.S. application Ser. No. 11/150,414 "Advanced triggers for location-based service applications in a wireless location system". The LMS passively monitors message traffic within the wireless communications system as to trigger the wireless location system based on pre-set criteria.

The network 710 further includes a Serving Mobile Location Center (SMLC) 712. The RNM 782 is the primary component that can be deployed at a carrier's cell sites. The RNM 782 is preferably implemented as a distributed network of radio receivers capable of receiving RACH and SDCCH messages for autonomous generation of location services. The RNM 82 tunes to directed frequencies to gather data for the system. The RNM 782 can then forward the collected data to the SMLC 712. All RNMs 782 in a network are preferably time-and frequency-synchronized through the use of the Global Positioning Satellite (GPS) constellation (not shown).

The SMLC 712 is preferably a high volume location-processing platform. The SMLC 712 contains U-TDOA and multipath mitigation algorithms for computing location, confidence interval, speed, and direction of travel. The SMLC 712 can also determine which wireless phones to locate based upon triggering from the link monitoring system (LMS) 711 or requests from the Lb interface 754 to an infrastructure vendor's Base Station Controller (BSC) 796 (or MSC 750 in some cases as the Ls interface). The SMLC 712 is typically co-located at the operator's BSC 796 but can also be remotely distributed. The primary functions of the SMLC 712 are to receive reports on signal detection from the RNMs 782, to perform location processing, and to calculate the location estimate for each signal. The SMLC 712 manages the network and provides carrier access to location records. The SMLC 712 is responsible for the collection and distribution of location records. The SMLC 712 also maintains configuration information and supports network management.

The LMS 711 continuously monitors all Abis signaling links 776 (and in some cases A-interface links 752 and GSM Mobile Application Protocol (GSM-MAP) 748 interface) in a network 710 to which the LMS 711 is connected. The function of the LMS 711 is to capture messages in the call (e.g., a GSM voice conversation, and SMS transaction or a GPRS data session) and SMS setup procedure, mid-call control messages, and call termination and release messages for MSs 780 and or UEs 788. The LMS 711 then forwards the data contained in those messages to the SMLC 712 for subsequent location processing.

The GSM service control function (gsmSCF) 720, also called a service control point (SCP), contains database and logical rules for providing non-call oriented services to a subscriber. The gsmSCF 720 connects to the MSC(s) and GSN(s) via CAMEL Application Part (CAP) 763 connections over the SS7 network 749. The GSM Mobile Application Protocol (GSM-MAP) 748 is the communications medium for call-related control services on the wired part of a wireless network. The GSM-MAP 748 exists to provide services like automatic roaming, authentication, location services inter-system hand-off, and short message service routing on a GSM or UMTS network. All wireless network elements such as the MSC 750, HLR 734, VLR (shown here as part of the MSC 750), GMSC 744, EIR 732, GMLC 798, and gsmSCF 720 use this messaging protocol to communicate among each other. The GSM-MAP 748 resides on the international Signaling System 7 (SS7) network (the MAP-CAP network 749).

The Gateway Mobile Location Center (GMLC) 798 is defined by 3GPP standards as the clearinghouse for location records in a GSM/GPRS/UMTS network. The GMLC 798 serves as a buffer between the tightly controlled SS7 network 749 and the public internet Authentication, access control, accounting, and authorization functions for location-based services are commonly resident on or controlled by the GMLC 798.

The Le interface 724 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 722 is also known as a LCS (Location Services). The LBS and LCS 722 are software applications and services uniquely enabled to use the location of a mobile device.

The E5+ interface 718 is a modification of the E5 interface defined in the Joint ANSI/ETSI Standard 036 for North American E9-1-1. The E5+ interface 718 connects the SMLC 12 and GMLC 98 nodes directly allowing for push operations when LMS 711 or RNM 782 triggers are used by the wireless location system with either network acquired information (cell-ID, NMR, TA, etc) or via TDOA and/or AoA (angle of arrival) performed by specialized receivers.

User equipment (UE) 788 can be defined as equipment such as a UMTS mobile device. NodeB 786 is the Universal Mobile Telephony System Radio Access Network (UTRAN) network interface to the UMTS radio interface. The Radio Network Controller (RNC) 770 enables autonomous radio resource management (RRM) by UTRAN. The RNC 770 performs the same functions as the GSM BSC, providing central control for the RNS elements (RNC and Node Bs). The RNC 770 handles protocol exchanges between Iu-PS 774, Iu-CS 762, Iur 761, and Iub 790 interfaces and is responsible for centralized operation and maintenance of the entire radio network system. The RNC 770 can communicate with other RNCs directly via the standardized Iur interface when necessary.

The Serving GPRS Support Node (SGSN) 768 monitors the location of individual GPRS capable Mobile Stations 780 and performs basic security functions and access control functions. The SGSN 768 can serve both the Global System for Mobility (GSM) radio access network (GERAN) and UMTS radio networks.

The Gateway GPRS Support Node (GGSN) 746 acts as a system routing gateway for the GPRS network. The GGSN 746 is a connection to external packet data networks (e.g., public internet) and performs the task of billing, routing, security firewalling, and access filtering. The Gateway MSC (GMSC) 744 acts as a bridge for roaming subscribers to visited MSCs in other operator's networks. Both control signaling and traffic trunks are setup via the GMSC 744.

The Um 715 is the GSM radio interface. The Uu 717 is the UMTS radio interface. The Iub interface 790 is located on a UMTS network and is found between the RNC (Radio Network Controller) 770 and the NodeB 786. The Iupc 772 interconnects the UMTS RNC 770 with the SMLC (also called the SAS) in the UMTS network for location estimation generation. The Iu-CS (Circuit Switched) interface 762 connects the UMTS RNC 770 with the circuit switched communications oriented network (the MSC 750). The Iu-PS (Packet Switched) interface 774 connects the UMTS RNC 770 with the packet switched communications oriented network (SGSN) 768. The Gb interface 766 interconnects the BSC 796 with the SGSN 768 allowing for routing of GPRS communications.

The Gn interface 760 is a GPRS network packet data interface which is located between the SGSN 768 and GGSN 746. The Gs interface 764 is a GPRS system interface located between the SGSN 768 and the MSC 750. The Gr (not shown) interface is a GSM-MAP interface which is located between the SGSN 768 and the Home Location Register (HLR) 734 carried on the SS7 network 749.

As described in U.S. Pat. No. 6,782,264, it is possible to monitor the base transceiver station (BTS) to base station controller (BSC) link (e.g., the Abis link) for triggering messages and information fields. A passive network monitor, called the AMS (Abis Monitoring System) in the '264 patent and exemplified by monitoring the GSM Abis interface, has been extended in accordance with the present invention and is now called the link monitoring system, or LMS. The link monitoring system (LMS) 711 can monitor multiple cellular network data links simultaneously, scanning for data of interest, and can detect particular messages or data fields within messages. Setting or tasking of messages or data fields of interest can take place at any time. When a match occurs, the LMS 711 may be further triggered to perform a pre-set action, such as a write to storage memory or forwarding of the triggering message and (or) data fields to another system node.

The radio network monitor 782 extends the concept of passive monitoring for location triggering information and messaging to the radio air interface. The RNM 782 can detect and monitor both uplink (mobile device to BTS or NodeB) and downlink radio communications.

The terms Mobile Device, Mobile, Mobile Phone or Mobile Subscriber Unit refers to the MS or UE in IEEE802.16e/m, GSM, UMTS, or multi-mode (such as GSM/UMTS networks) networks. The MS 780 in GSM comprises two distinct elements, the ME (Mobile Equipment) and the SIM (Subscriber Identity Module). The UE in UMTS is a combination of ME (Mobile Equipment) and SIM/U.S.IM (Subscriber Identity Module/UMTS Subscriber Identity Module).

A Mobile device may allow multi-mode or multi-radio operations to access multi-technology wireless communications networks or disparate wireless communications networks using disparate radio access technologies. As shown in this FIG. 7 the mobile device could contain dual mode functionality of the GSM Mobile Station (MS) 780 and UMTS User Entity (UE) 788. The Mobile Device would typically implement both functionalities using common circuitry and computational faculties.

Triggering and Tasking for Femto-Cell Location

Figure 8:
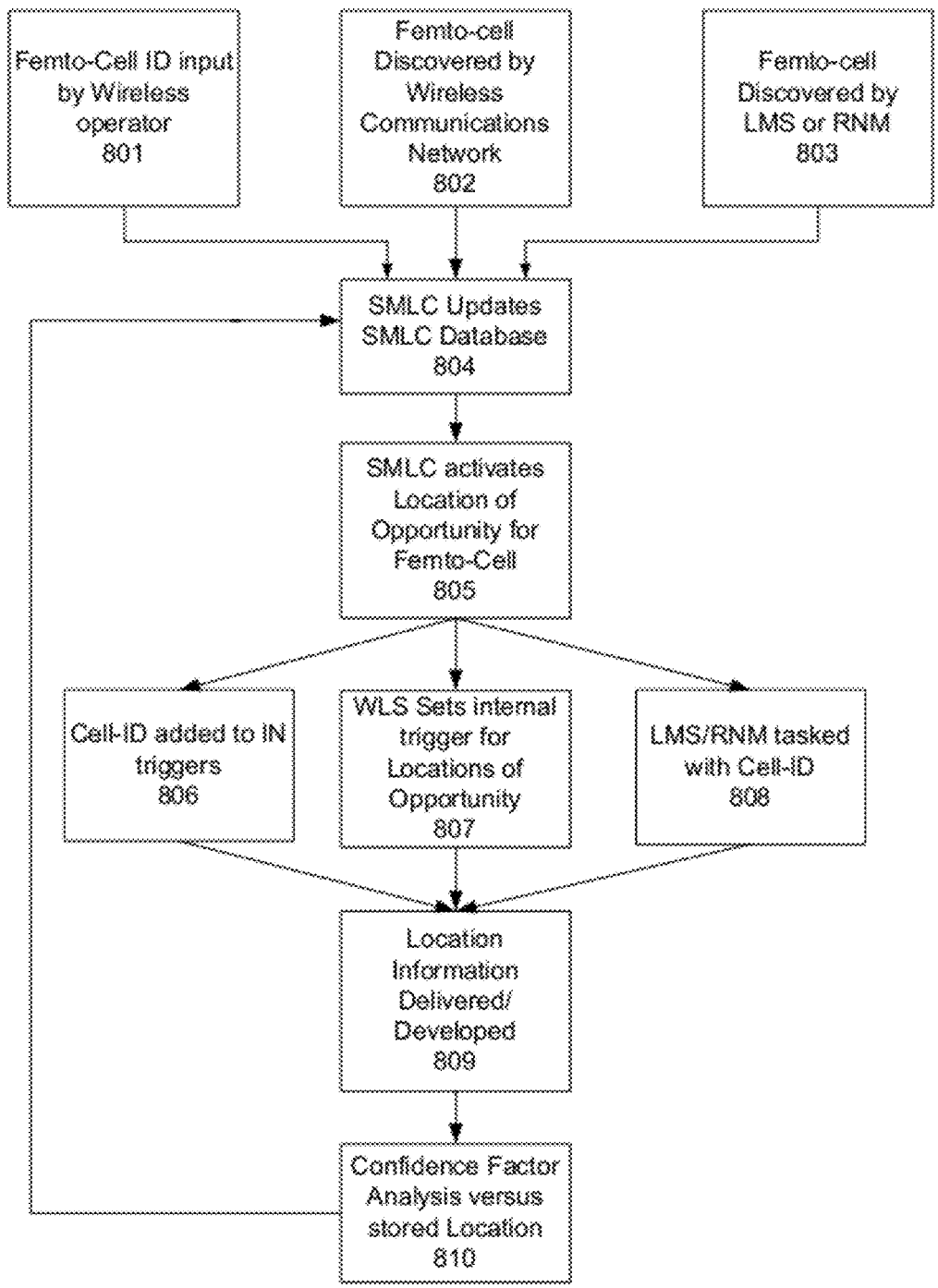
FIG. 8 illustrates a recursive femto-cell location-by-proxy procedure.
Figure 8A:
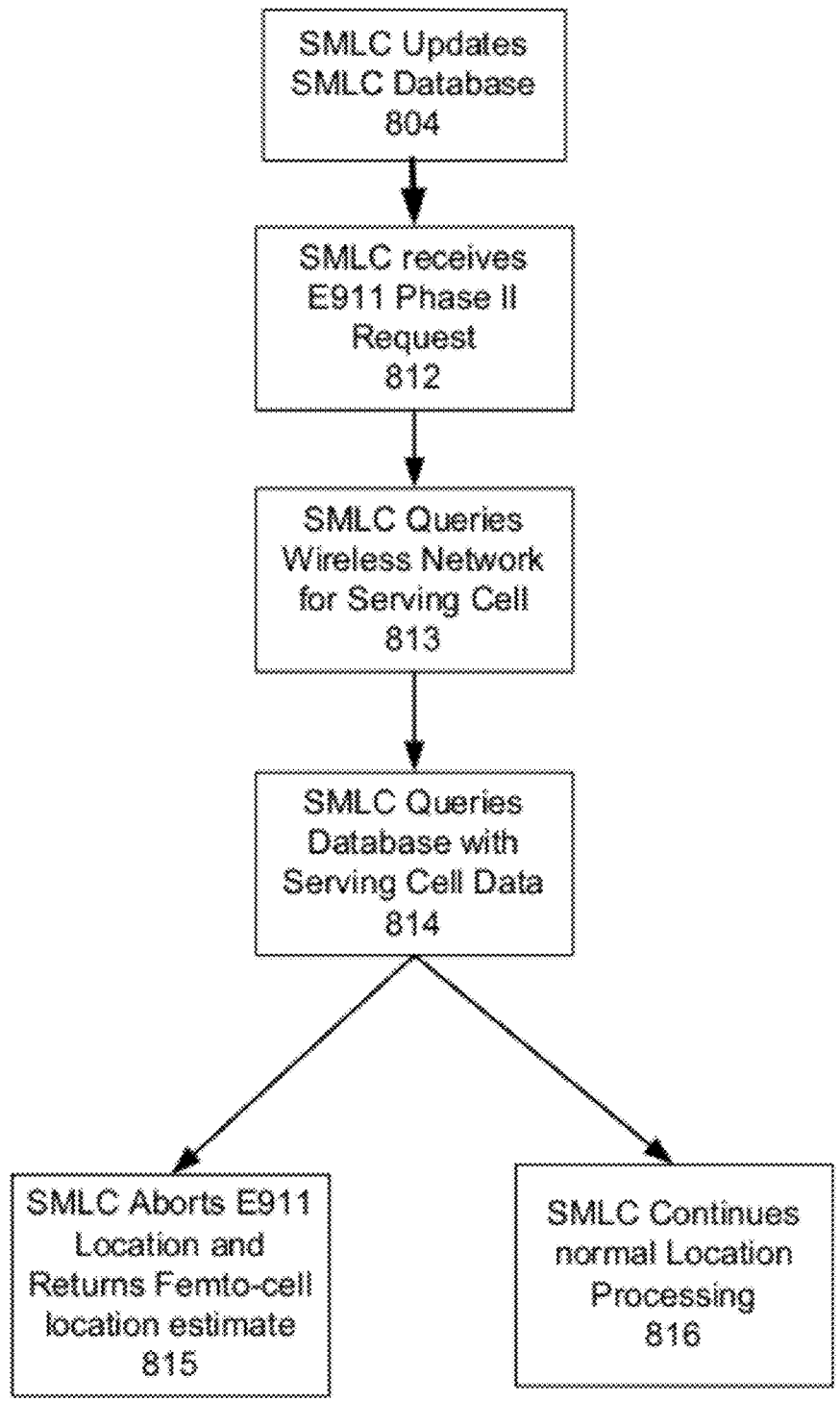
FIG. 8a illustrates a procedure for handling an emergency services location request.
Figure 8B:
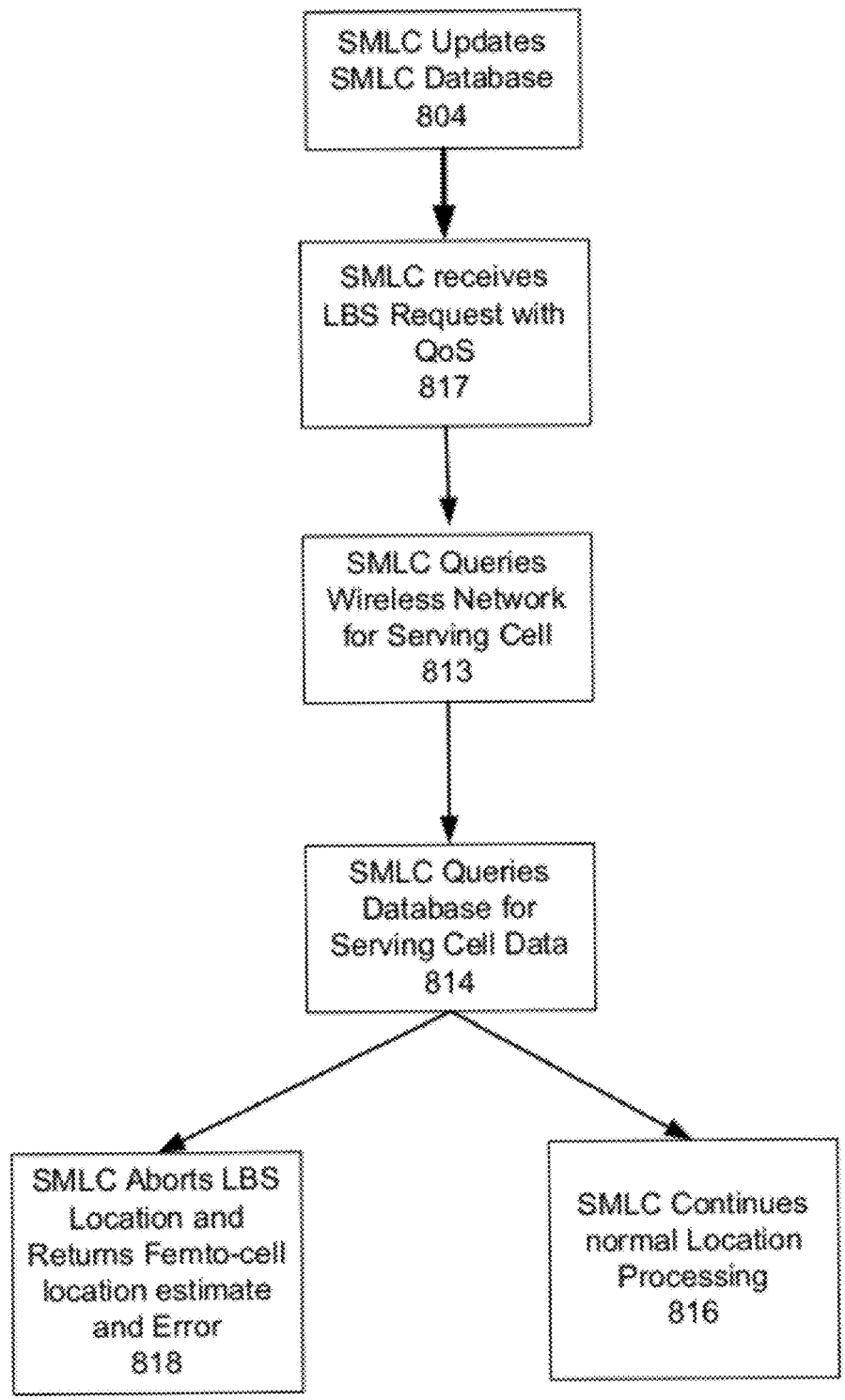
FIG. 8b illustrates a procedure for handling a location based services (LBS) request.
Figure 8C:
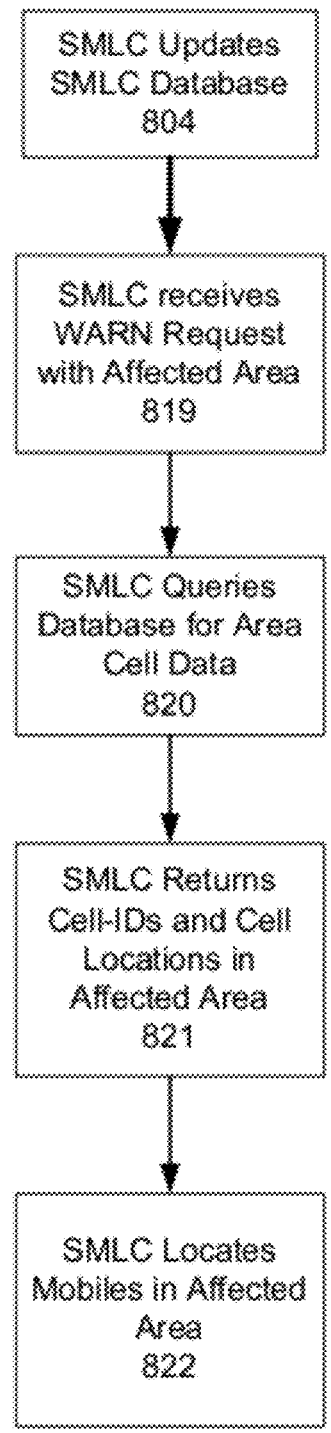
FIG. 8c illustrates a procedure for handling a WARN (Warning, Alert and Response Network) request.

As shown in FIG. 8, the SMLC 608 may be passed cell information 801 manually or from a wireless network operator's Operations Support System (OSS). The OSS is a network management system supporting network configuration, fault monitoring, performance evaluation, security auditing and event detection, optimization, etc. The femto-Cell may also be discovered via the Wireless Communications Network 802 via analysis of call detail records or if an LMS or RMS facility is available, discovered by monitoring of Wireless Communications Network link traffic for new cell-IDs within messages related to call events.

Once a femto-cell ID has been determined and the cell-ID and any associated location information (including Cell location quality) stored by the SMLC database 804, the SMLC activates a Location of Opportunity 805 capability where, dependent on the deployed equipment and operator preferences, Cell-ID triggers may be added via a Wireless intelligent network facility 806 (the Iota interface or similar). Alternately, the WLS may set internal triggers for the femto-cell Cell-ID 807 so that matter-of-course locations performed on mobiles may be examined for the femto-cell ID. Finally, the WLS may set Cell-ID triggers in the RNM or LMS, so that detection of the cell-ID will provoke the WLS to attempt a location.

Once the proxy location information, whatever the source, has been delivered to the SMLC, a location can be calculated 809. This calculation may attempt to include an offset distance from the proxy mobile and the femto-cell in question. A location confidence factor is also calculated in this step.

The calculated location is then compared to the location present in the SMLC database for the current Cell-ID 801. If the calculated confidence factor is better than that of the cell location quality, then the SMLC database may be automatically updated or the operator OSS informed of the determined cell location error.

In cases where femto-cell location is provided or the femto-cell location is autonomously developed, the SMLC can use location resources to occasionally (or at operator request) confirm, and re-confirm, the femto-cell location and alert the network operator of changes. In cases where the femto-cell ID is given but no location is provided, the SMLC will allocate location, and where available link monitoring, resources in an effort to localize the identified femto-cell.

Once the wireless location system has located the femto-cell via proxy, analysis of the confidence factor (a measure of how good the location actually is) based on factors such as cell size, number of sectors, received power levels, innate precision of the location technique used is performed. If the confidence is too low (that is the location of the femto-cell is not known to the desired accuracy), then the Wireless Location System will attempt to over time re-locate the femto-cell to a more accurate level. This re-location or confirmation of location can be performed using increasingly precise wireless location technology as available.

As the number of proxy locations and proxy location with range estimates increase for a femto-cell, statistical methods may be employed to further refine the location of the femto-cell. The SMLC is used to calculate the mobile location in all cases.

FIG. 9a shows the reported mobile location 901 at the antenna and location error area 902 when only the Cell-ID (CGI in GSM) is reported for an omni-directional (single sector) cell. This technique may be useful when the cell size is small, when the cell is not sectorized, or when no potential handover candidates are being reported by the mobile device. The location error area 902 is actually larger then the cell coverage area 901 by the radius of the known or predicted femto-cell coverage area 903. The cell-ID location error area is assigned a low probability score and dimensions and probability recorded in the SMLC database.

FIG. 9b shows the reported cell§or mobile location 905 and location error area 906 when the Cell-ID and serving sector 903 (CGI in GSM) is reported for a sectored cell. This technique is most useful when the cell size is small or when no potential handover candidates are being reported by the mobile device. The reported cell§or location 904 is reported as ½ radius from the sector antenna 901 along the sector bisector 907.

The location error area 906 may be larger then the cell coverage area 901 since the radius of the known or predicted femto-cell coverage area 903. The cell-ID§or location error area is assigned a low probability score and dimensions and probability recorded in the SMLC database.

Figure 9D:
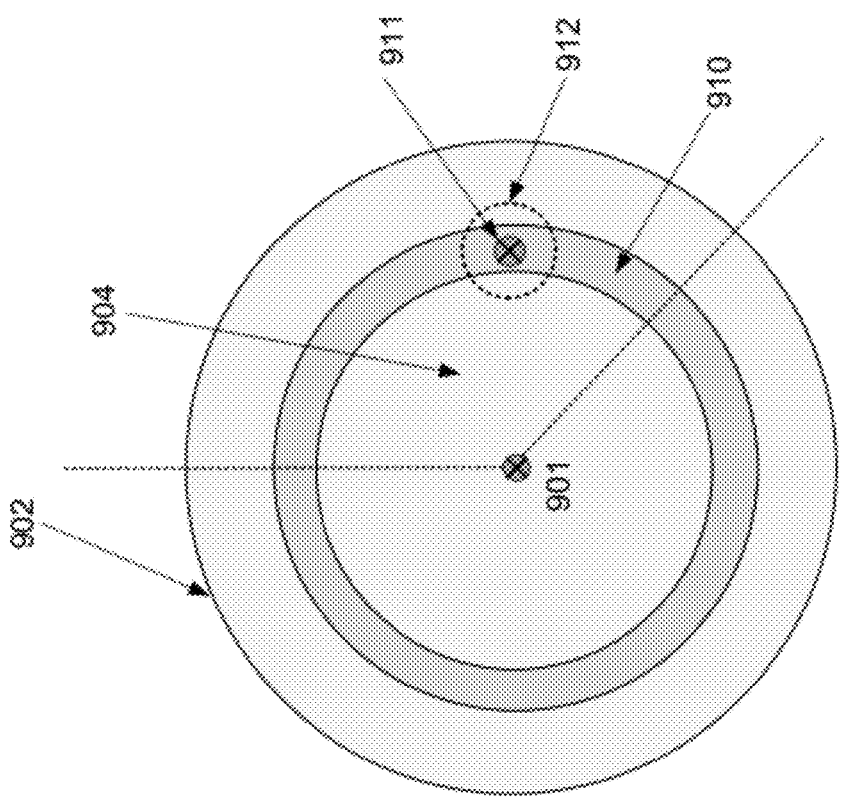
Figure 9C:
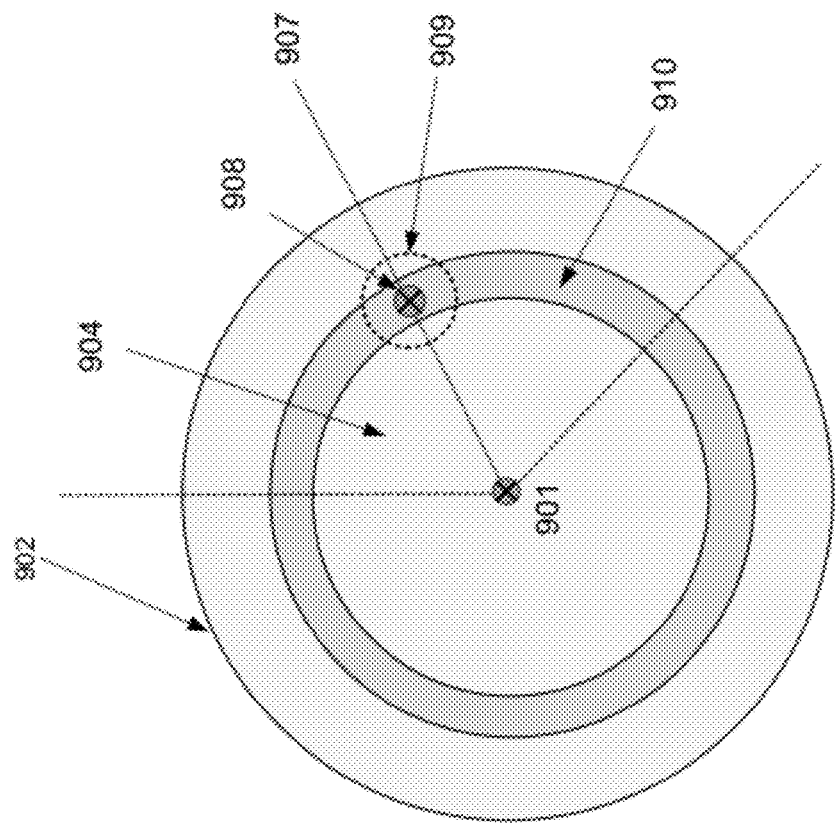

FIG. 9c shows the reported location of the mobile 908 using cell-sector-timing (in the GSM example, this is the CGI+TA technique, in UMTS this is called CI+RTT). While this example shows a sectored configuration, in an omni-directional cell the CGI+TA technique produces an error area limited by the TA+1 radius (1 TA band=554 meters, 1 RTT band=78 meters) centered on the serving antenna 901. In the sectored case shown in FIG. 9c, the cell area 902 is sectorized and the serving sector 903 is bisected by an imaginary line 907. The mobile reports as using a Timing Advance (or Round-trip-time) value of "TA" or "Chips". The ranging measurement (TA or RTT) is shown as a band 910 across the serving sector 904. Using the reported timing and the speed of light in air to develop a range, the reported CGI+TA mobile location 908 is 554(TA+½) meters from the serving antenna 901 along the sector bisector 907. In UMTS, the reported CI+RTT is 78(Chip(s)+½) meters from the serving antenna 901 along the sector bisector 907. The cell-ID+sector+Time based ranging (CGI+TA or CI+RTT) location error area is assigned a medium probability score and the dimensions of the error area and probability recorded in the SMLC database.

FIG. 9d shows the reported location of the mobile 908 using cell-sector-timing-PDOA (in the GSM example, this is known as the Enhanced Cell-ID (ECID) or the CGI+TA+NMR technique). While this example shows a sectored configuration, in an omni-directional cell the CGI+TA+NMR technique produces a similar size error areas.

In the example shown in FIG. 9d, the cell area 902 is sectorized with a serving sector 904 reported by the mobile device. The mobile also reports a Timing Advance value of "TA", the TA is shown geographically as a band 910 across the serving sector 904. Using the reported timing and the speed of light in air to develop a range, the initial CGI+TA+NMR mobile location 908 is 554(TA+½) meters from the serving antenna 901. This initial estimate is refined (if 3 or more inter-cell handover candidates are available) using a power-difference-of-arrival (PDOA) calculation. The power levels and locations of the inter-cell handover candidates are known to the SMLC and stored in the SMLC database allowing for normalization of power levels prior to the PDOA calculation. The ECID reported location error area 912 is assigned a medium probability score and the dimensions of the error area and probability recorded in the SMLC database. When the mobile station uses a spread spectrum technique in a synchronized network, for example the Code Division Multiple Access (CDMA) used in CDMAOne (IS-95) or CDMA200 (IS-2000) systems, location techniques such as Forward link trilateration (FLT) and PSMM (Power Strength Multiple Measurement) can be used to localize a mobile who reports the femto-cell ID in its soft handoff, candidate, or neighbor lists as used in the Mobile-assisted-handoff (MAHO) operation. For spread spectrum unsynchronized networks such as the 3GPP UMTS system (a wideband CDMA system) mobile location for a mobile with the femto-cell ID in its soft handoff, candidate, or neighbor sets (again available as part of the MAHO operation) can occur using the Observed-Time-Difference-of-Arrival (O-TDOA) mobile-based technique if available within the wireless communications network.

Figure 9F:
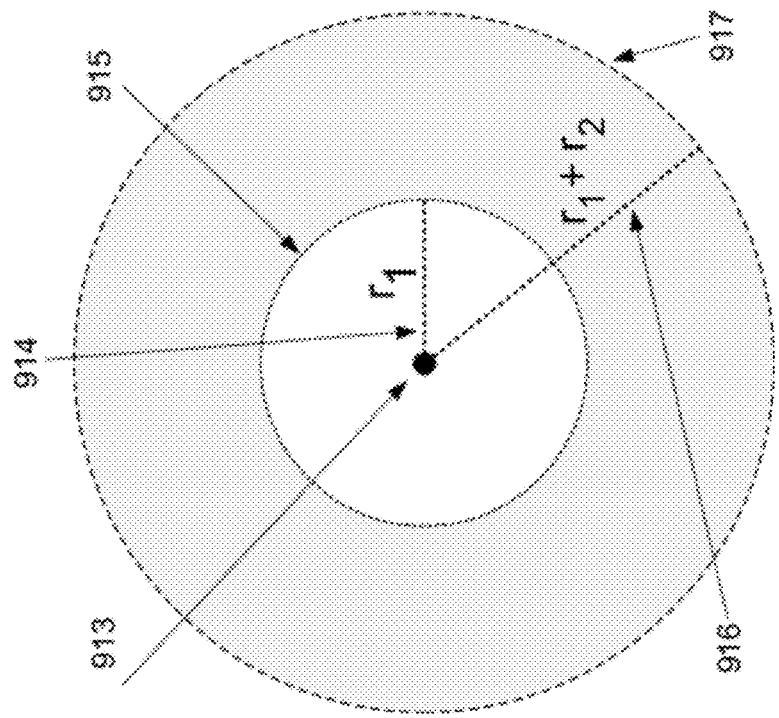
FIG. 9f is used to explain the evaluation of location error for each proxy location.
Figure 9E:
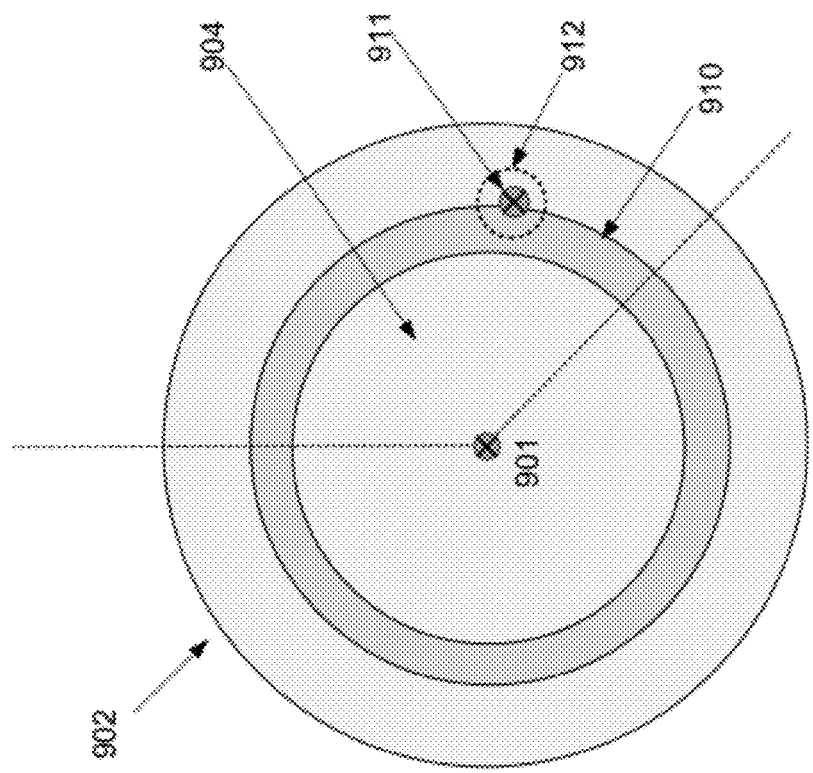

FIG. 9e illustrates the combination of the network-based location techniques with mobile device base location techniques. In this example, the GSM mobile is equipped with EOTD or A-GPS capability. As in FIG. 9d, the serving cell-area 902 (CGI), serving sector antenna 901, the reported TA value (shown as a sector spanning band 910), and NMR information is used as available to create an initial network-based location estimate. This initial estimate is further refined by combination with the mobile developed location estimate into a Hybrid proxy location.

The Hybrid proxy location error area 912 is assigned a high probability score and the dimensions of the error area and probability recorded in the SMLC database.

FIG. 9f graphically shows the methodology for estimation of the femto-cell location using a location developed for a mobile proxy. The calculated location of the proxy mobile 913 forms the center of a circular probability area 917. Please note that other error areas based on polygons, ellipse or other shapes are omitted here only for the purpose of simplicity of illustration. Examples of other location error shapes can be found in 3GPP Technical Specification "*Universal Geographical Area Description (GAD)*" Document ID: 3GPP TS 23.032 V7.0.0 (published June 2006). The circular probability area 917 has radius 916. The circular probability area radius 916 is the sum of the error components r1 (the location error inherent, estimated, or calculated in the location technique used) 914 and the estimated range (r2) between the proxy and femto-cell based on the power or signal quality measurements available via the proxy mobile. Addition of both the error and estimated range 916 produces a area of probability for the femto-cell location.

Figure 9G:
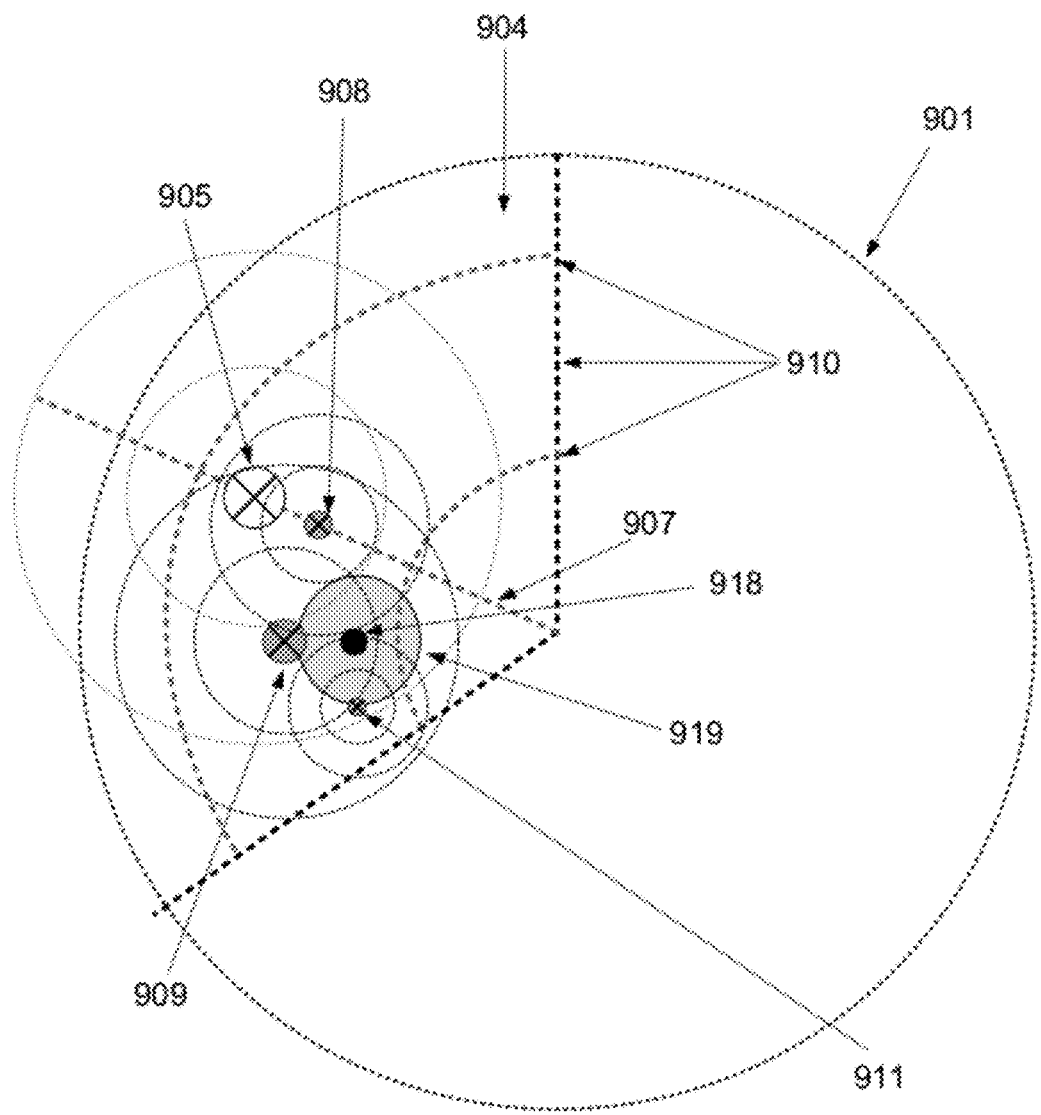
FIG. 9g graphically illustrates the combination of locations in developing a more accurate femto-cell location using the proxy location technique.

FIG. 9g depicts proxy location of the femto-cell using each of the example location techniques. A first mobile device in serving cell 901 and serving sector 903 allows localization to the sector 905. A second mobile device in serving cell 901 and serving sector 903 with timing advance TA 910 allows generation of a refined location estimate 908. A third mobile device in serving cell 901, serving sector 903, with timing advance TA 910, and 3 or more reported inter-cellular handoff candidates in its Network Measurement Report permits further refinement to the proxy location 909. A fourth mobile with on-board location capability and the femto-cell as the serving cell or as a handoff candidate allows for an additional location estimate 911. By combining the reported proxy locations, the reported location errors for each proxy location, and the range estimates of the proxy from the femto-cell, an optimized femto-cell location by Proxy location 918 and location error estimate 919 for the femto-cell location can be developed.

Femto-cell Location for RF Planning and Coordination

Femto-cells have some deployment issues. One such issue is the behavior of autonomous, plug-and-play femto cells to function in the overall macro cell radio frequency plan with no end-user or installer inputs. In other words, potentially hundreds of femto-cells per cell or millions per radio communications network must interact with the larger cellular infrastructure in the RF domain and in doing so, the femto-cells and/or the wider wireless communications network must act mitigate the potential (or ongoing) interference with other femto cells and with the surrounding macro cell radio communications network while preserving the benefits of frequency and radio channel reuse. This frequency management is necessitated by the quality of service expectations of the user population and regulatory agencies. Unlike currently deployed IEEE802.11 WiFi data networks made of autonomous access points working in unregulated radio spectrum subject only to local regulatory compliance, wireless communications systems using femto-cells will be subject to regulations such as the FCC E9-1-1 Phase 1 and Phase 2 mandates. Dual mode WLAN and cellular protocol femto-cells will have to meet both sets of regulatory obligations. It is this quality-of-service expectation and regulation that makes femto-cell air interface reliability a requirement.

To increase capacity, wireless network providers may want femto-cells using the same channel as their macro cell radio access network. This reuse could inevitably cause interference: femto-versus-macro cell, femto-versus-femto versus macro, etc. Ultimately, the result could be downgraded network performance, awkward inter-BTS handoffs, and a burden on the core network in terms of cell management. Currently RF planning and interference reduction includes specific, technical solutions from femto-cell vendors. Some femto-cell vendors have designed their femto-Cell products to automatically select non-interfering channels and adjust their transmit power to avoid interference, increasing the cost and complexity of the femto-cell. Even so, interference with neighboring or geographically proximate femto-cells must be expected.

One way to avoid femto-cell interference would be for the wireless radio access network provider to acquire new radio spectrum (or segregate existing spectrum) to be used primarily for femto-cell deployments so there is no interference possible with between the isolated femto-cells and the wide area communications network. With distinct spectrums, deployment of femto-cells is possible with no interference (and thus no RF planning is required for integration) with the wide area radio access network.

Some femto-cell vendors have integrated a GNSS (such as a NavStar GPS) receiver within the BTS equipment to locate and in some cases lock the femto-cell when it is moved to a different location or country. This GNSS location receiver this of marginal utility, as the receiver is often unable to obtain the indoor position of the femto-Cell, because of attenuation of the weak satellite transmitted signal by the surrounding structure. Some wireless network providers are going as far as to limit femto-cell deployments by having the femto-cell automatically deactivate in places and times where GNSS location measurements are not available.

A lower cost femto-cell solution for radio-frequency management is proposed using available wireless location technologies to derive the femto-cell location and provide that location and RF data to radio network planning and monitoring tools. This same approach to location allows the femto-cell to provide location for emergency services. femto-cell location is also vital for conformance with the geographic coverage requirements inherent in licensed spectrum. A femto-cell moved outside the wireless network provider's licensed area must not be allowed to interfere with another carrier's radio access network. A discovered location prevents this from occurring. As an added benefit, femto-cell location allows for small and regional wireless network providers to offer and use femto-cells.

Femto-Cell Location for Emergency Services

Location of callers using a femto-cell is required under the FCC's E911 Phase I and Phase II mandate. Since the femto-cell may be end user installed and re-installed, a static location programmed into the femto-cell at installation may be unavailable or simply incorrect. Since femto-cell has a limited coverage area and is designed to be used to provide that coverage to areas possibly blocked by structural materials from the macro-cellular network coverage; location of the femto-cell (cell-ID) should satisfy both the E911 Phase I and Phase II mandates. Use of the time-based ranging technique [examples include; cell-ID with timing advance (for GSM), serving-one-way-delay (for CDMA), or Cell-ID with ½ Round Trip Time (RTT) (for UMTS)] can be used to improve the Cell-ID based femto-cell location once the latitude and longitude of the femto-cell is discovered.

Figure 10A:
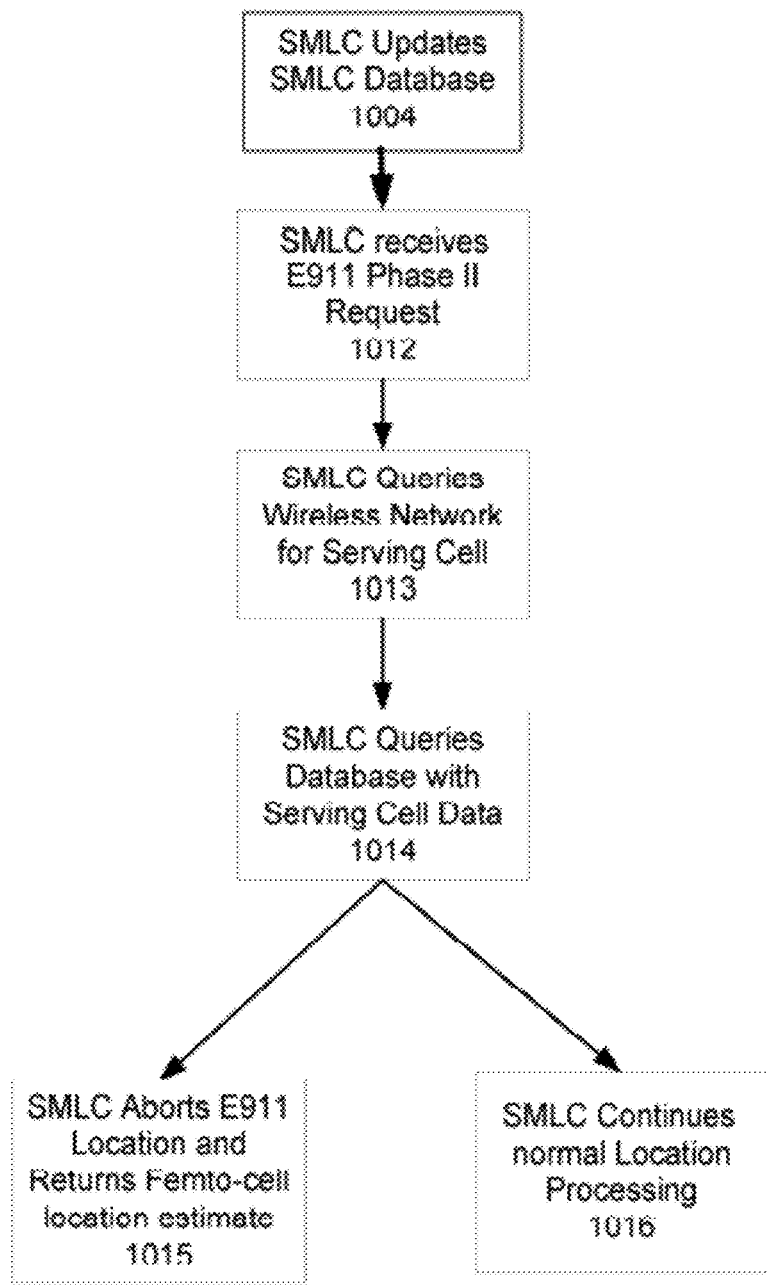
FIG. 10a illustrates a procedure for handling an emergency services location request.

As shown in FIG. 10*a*, the SMLC (after population of the SMLC database) can respond to an Emergency Services Location Request 1012 by Querying the Wireless Location Network 1013 for the serving cell ID and channel information as is the nominal case. In many cases, the serving cell-ID may be delivered in the actual request message. The SMLC uses the serving cell data (whatever the source) to query the SMLC database 1014. If the serving cell is determined to be a femto-cell and the femto-cell has been located to an accuracy above an acceptable (to the PSAP or Regulatory Agency) threshold, then the SMLC aborts the location attempt and returns the serving femto-cell location 1015 (and optionally the femto-cell location error estimate and the femto-cell error estimate and any ranging provided by time or power based measurements between he mobile and femto-cell). If the SMLC database query 1014 shows that the serving cell is not a femto-cell, then normal location processing proceeds 1016.

Also, under the provisions of the 2006 Warning, Alert and Response Network (WARN) Act, the location of callers using a femto-cell can be provided for emergency warning, advisory, alert and notification (also known as reverse 9-1-1) services.

Figure 10B:
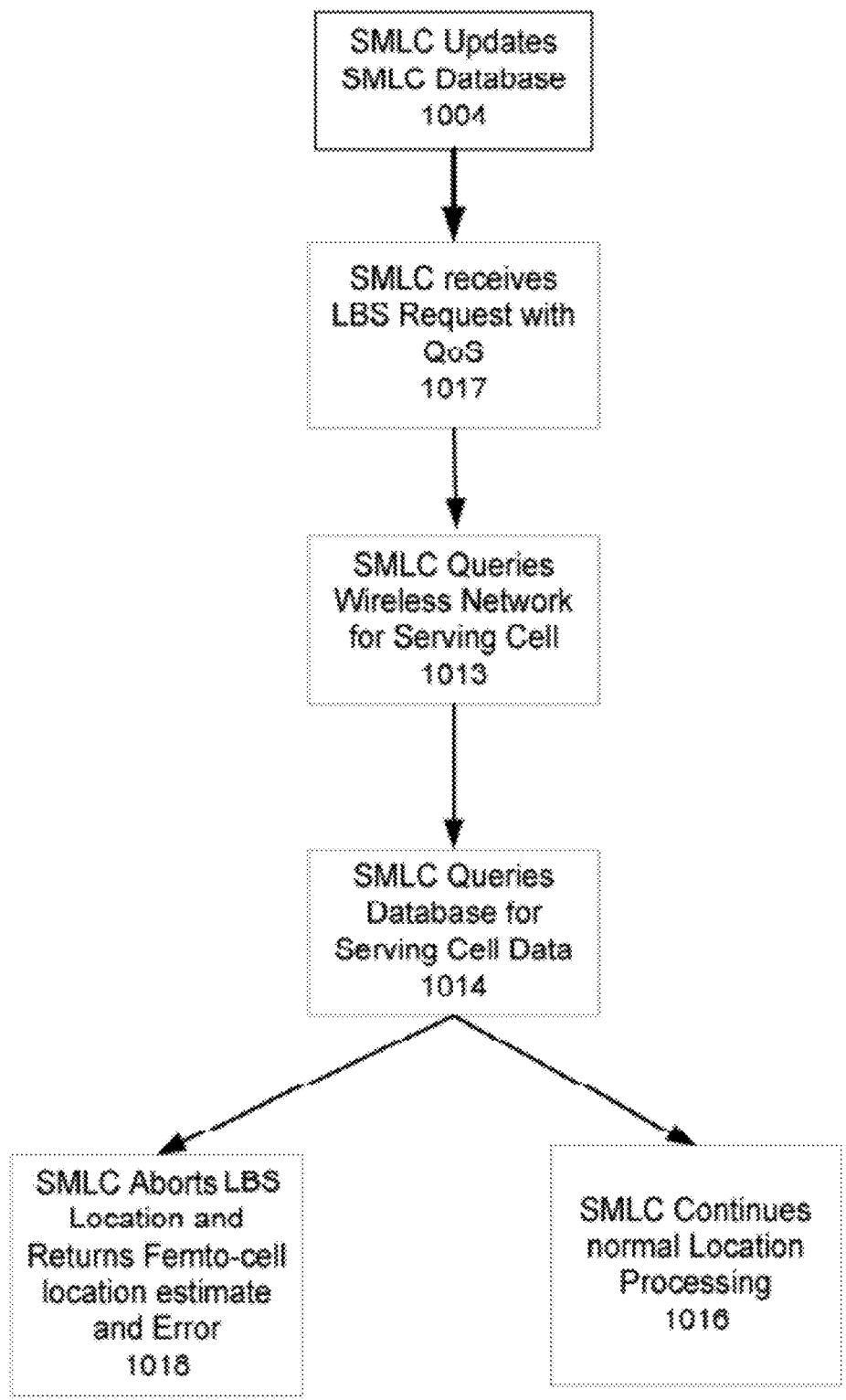
FIG. 10b illustrates a procedure for handling a location based services (LBS) request.
Figure 10C:
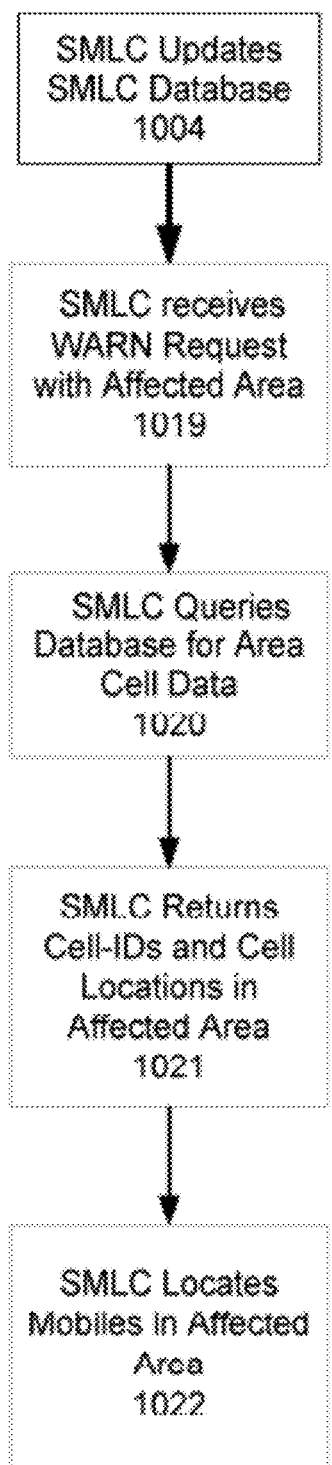
FIG. 10c illustrates a procedure for handling a WARN (Warning, Alert and Response Network) request.

As shown in FIG. 10*c*, the SMLC (after population of the SMLC database 1004) can respond to a WARN Request 1012 by Querying the Wireless Location Network 1019 for the serving cell IDs in an affected area. The SMLC would then query the SMLC database for Cell-IDs in the geographically described affected area 1020 and geographic locations of the cell sites, both macro and femto cells, in the affected area would be returned 1021.

The SMLC may also be tasked to provide more accurate (than cell-ID) location on mobile stations in the affected area and/or provide identification on mobiles within the affected area. Using wide area localization 1022, mobiles within the affected area can be identified and located to varying degrees of accuracy.

Femto-Cell Location for Commercial Location Services

Commercial Location-based services require location of the mobile. For mobile devices using a femto-cell for connection to the wireless communications network, location using downlink mobile-based techniques or GNSS techniques is problematic since femto-cells are designed to serve areas blocked or severely attenuated by structural materials both the macro-cellular network and GNSS satellite signals. Also, since femto-cells may be end user installed and re-installed, a static location programmed into the femto-cell at installation may be unavailable or simply incorrect. Using a discovered location (via the described uplink and downlink techniques) of the femto-cell, as a mobile device location allows for use of commercial location-based services and applications (such as mobile search, localized advertising, or mobile social networking) by users served by the femto-cell.

As shown in FIG. 10b the SMLC (after population of the SMLC database) can respond to an Commercial Location-based Services (LBS) Location Request 1017 by Querying the Wireless Location Network for the serving cell ID and channel information as is the nominal case. In many cases, the serving cell-ID may be delivered in the actual request message. The SMLC uses the serving cell data (whatever the source) to query the SMLC database. If the serving cell is determined to be a femto-cell and the femto-cell has been located to an accuracy above an acceptable (via the location quality-of-service (QoS) requested) threshold, then the SMLC aborts the LBS location attempt and returns the serving femto-cell location 1018 (and optionally the femto-cell location error estimate and the femto-cell range error estimate based on any available time or power based measurements between the mobile and femto-cell). If the SMLC database query shows that the serving cell is not a femto-cell, then normal location processing proceeds 1016.

Conclusion

The true scope the present invention is not limited to the presently preferred embodiments disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A method for use by a wireless location system (WLS) in locating a femto-cell device operating in a wireless communications system, wherein the WLS includes a serving mobile location center (SMLC), a plurality of location measuring units (LMUs) in communication with the SMLC, a plurality of link monitors in communication with the SMLC, and an SMLC database in communication with the SMLC and containing cell locations and other radio aspects of the wireless communications system, the method comprising:
   (a) discovering and initiating location of the femto-cell device, wherein said discovering and initiating comprises at least one of the following procedures: (a1) receiving femto-cell ID information from the wireless communications system; (a2) discovery of the femto-cell ID information via analysis of call detail records; and (a3) discovery of the femto-cell ID information via monitoring of wireless communications system link traffic for new cell-IDs within messages related to call events;
   (b) storing the femto-cell ID information in the SMLC database;
   (c) setting a trigger for location of the femto-cell device, wherein said setting a trigger comprises at least one of the following procedures: (c1) setting a femto-cell cell-ID trigger in the SMLC database via a wireless intelligent network (WIN) facility; (c2) setting an internal femto-cell cell-ID trigger in the SMLC database to indicate to the WLS that mobile station (MS) location information should be examined to identify when the femto-cell device is serving the MS; (c3) setting a femto-cell cell-ID trigger in a radio network monitor (RNM) or link monitoring system (LMS) associated with the WLS, wherein the WLS is configured such that detection of the femto-cell cell-ID provokes the WLS to attempt location of the femto-cell device;
   (d) determining an identification of a MS being served by the femto-cell device;
   (e) determining the location of the MS and providing MS location information to the SMLC database;
   (f) calculating the location of the femto-cell device using the location of the MS;
   (g) calculating a confidence factor relating to the calculated location of the femto-cell device;
   (h) comparing the calculated confidence factor with a confidence factor stored in the SMLC database;
   (i) determining that the calculated confidence factor is better than the stored confidence factor; and
   (j) taking a further action including at least one of: notifying an operator of the wireless communications system of an error in stored location information associated with the femto-cell device; and updating the location information associated with the femto-cell device in the SMLC database.

2. A method as recited in claim 1, further comprising determining that the calculated confidence factor is below a prescribed value and attempting to obtain a more accurate location of the femto-cell device.

3. A method as recited in claim 1, further comprising use of the femto-cell device location for radio frequency (RF) planning and coordination.

4. A method as recited in claim 3, wherein said RF planning and coordination includes preventing the femto-cell device from interfering with other cells when the femto-cell device is re-located.

5. A method as recited in claim 1, further comprising use of the femto-cell device location for emergency services.

6. A method as recited in claim 1, further comprising use of the femto-cell device location for warning, alert and response network (WARN) services.

7. A method as recited in claim 1, further comprising use of the femto-cell device location for commercial location services.

8. A method as recited in claim 1, further comprising determining a distance separating the femto-cell device from the MS, and calculating the location of the femto-cell device using the location of the MS and the distance separating the femto-cell device from the MS.

9. A method as recited in claim 1, wherein the wireless communications system comprises, in addition to said femto-cell device, a plurality of macro-cells and at least one micro-cell.

10. A method as recited in claim 9, wherein said femto-cell device is an under-lay femto-cell situated within a radio footprint of a single macro-cell.

11. A method as recited in claim 9, wherein said femto-cell device is a border femto-cell situated within the radio footprints of multiple macro-cells.

12. A method as recited in claim 9, wherein said femto-cell device is a remote femto-cell situated outside the radio footprint and coverage areas of all macro-cells of the wireless communications system.

13. A method as recited in claim 1, wherein the location of the MS is calculated by the MS and provided by the MS.

14. A method as recited in claim 13, wherein the MS is a Global Navigation Satellite System (GNSS)-capable device comprising a receiver capable of receiving GNSS satellite signals.

15. A method as recited in claim 1, wherein the location of the MS is calculated by a network-based wireless location system.

16. A method as recited in claim 15, wherein the location of the MS is determined using MS uplink transmissions during a handover procedure.

17. A subsystem for use by a wireless location system (WLS) in locating a femto-cell device operating in a wireless communications system, wherein the WLS includes a serving mobile location center (SMLC), a plurality of location measuring units (LMUs) in communication with the SMLC, a plurality of link monitors in communication with the SMLC, and an SMLC database in communication with the SMLC and containing cell locations and other radio aspects of the wireless communications system, the subsystem comprising:
  (a) means for discovering and initiating location of the femto-cell device, wherein said discovering and initiating comprises at least one of the following procedures: (a1) receiving femto-cell ID information from the wireless communications system; (a2) discovery of the femto-cell ID information via analysis of call detail records; and (a3) discovery of the femto-cell ID information via monitoring of wireless communications system link traffic for new cell-IDs within messages related to call events;
  (b) means for storing the femto-cell ID information in the SMLC database;
  (c) means for setting a trigger for location of the femto-cell device, wherein said setting a trigger comprises at least one of the following procedures: (c1) setting a femto-cell cell-ID trigger in the SMLC database via a wireless intelligent network (WIN) facility; (c2) setting an internal femto-cell cell-ID trigger in the SMLC database to indicate to the WLS that mobile station (MS) location information should be examined to identify when the femto-cell device is serving the MS; (c3) setting a femto-cell cell-ID trigger in a radio network monitor (RNM) or link monitoring system (LMS) associated with the WLS, wherein the WLS is configured such that detection of the femto-cell cell-ID provokes the WLS to attempt location of the femto-cell device;
  (d) means for determining an identification of a MS being served by the femto-cell device;
  (e) means for determining the location of the MS and providing MS location information to the SMLC database;
  (f) means for calculating the location of the femto-cell device using the location of the MS;
  (g) means for calculating a confidence factor relating to the calculated location of the femto-cell device; and
  (h) means for comparing the calculated confidence factor with a confidence factor stored in the SMLC database.

18. A subsystem as recited in claim 17, further comprising means for determining that the calculated confidence factor is better than the stored confidence factor, and updating location information associated with the femto-cell device in the SMLC database.

19. A subsystem as recited in claim 17, further comprising means for determining that the calculated confidence factor is better than the stored confidence factor, and notifying an operator of the wireless communications system of an error in the stored location information associated with the femto-cell device.

20. A subsystem as recited in claim 17, further comprising means for determining that the calculated confidence factor is below a prescribed value and attempting to obtain a more accurate location of the femto-cell device.

21. A subsystem as recited in claim 17, further comprising means for determining a distance separating the femto-cell device from the MS, and means for calculating the location of the femto-cell device using the location of the MS and the distance separating the femto-cell device from the MS.

22. A subsystem as recited in claim 17, wherein the location of the MS is calculated by the MS and provided by the MS.

23. A subsystem as recited in claim 17, wherein the location of the MS is calculated by the WLS.

24. A subsystem as recited in claim 23, wherein the location of the MS is determined using MS uplink transmissions during a handover procedure.

* * * * *